(12) United States Patent
Lambic et al.

(10) Patent No.: US 12,473,319 B2
(45) Date of Patent: Nov. 18, 2025

(54) TRANSITION METAL-COMPLEX CATALYSTS HAVING APPENDED GROUP 13 LEWIS ACIDS AND RELATED POLYMERIZATION METHODS

(71) Applicant: ExxonMobil Chemical Patents Inc., Baytown, TX (US)

(72) Inventors: Nikola S. Lambic, Houston, TX (US); Matthew W. Holtcamp, Huffman, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 543 days.

(21) Appl. No.: 17/997,123

(22) PCT Filed: Apr. 23, 2021

(86) PCT No.: PCT/US2021/028837
§ 371 (c)(1),
(2) Date: Oct. 25, 2022

(87) PCT Pub. No.: WO2021/222018
PCT Pub. Date: Nov. 4, 2021

(65) Prior Publication Data
US 2023/0192744 A1 Jun. 22, 2023

Related U.S. Application Data

(60) Provisional application No. 63/018,653, filed on May 1, 2020.

(51) Int. Cl.
*C07F 15/06* (2006.01)
*C07F 15/02* (2006.01)
*C08F 10/02* (2006.01)

(52) U.S. Cl.
CPC .......... *C07F 15/065* (2013.01); *C07F 15/025* (2013.01); *C08F 10/02* (2013.01)

(58) Field of Classification Search
None
See application file for complete search history.

(56) References Cited

U.S. PATENT DOCUMENTS

| | | | |
|---|---|---|---|
| 6,175,409 B1 | 1/2001 | Nielsen et al. | 356/337 |
| 6,214,761 B1 | 4/2001 | Bennett | 502/117 |
| 6,260,407 B1 | 7/2001 | Petro et al. | 73/61.52 |
| 6,294,388 B1 | 9/2001 | Petro | 436/8 |
| 6,406,632 B1 | 6/2002 | Safir et al. | 210/656 |
| 6,436,292 B1 | 8/2002 | Petro | 210/656 |
| 6,454,947 B1 | 9/2002 | Safir et al. | 210/656 |
| 6,461,515 B1 | 10/2002 | Safir et al. | 210/656 |
| 6,475,391 B2 | 11/2002 | Safir et al. | 210/656 |
| 6,491,816 B2 | 12/2002 | Petro | 210/198.2 |
| 6,491,823 B1 | 12/2002 | Safir et al. | 210/656 |

FOREIGN PATENT DOCUMENTS

| | | | | |
|---|---|---|---|---|
| WO | WO 99/50318 | * | 10/1999 | C08F 10/00 |
| WO | WO2011/126784 | | 10/2011 | C08F 210/16 |
| WO | WO2019/27586 | | 2/2019 | C08F 4/659 |

OTHER PUBLICATIONS

Gorl, et al., "Influence of the para-substitution in bis(arylimino)pyridine iron complexes on the catalytic oligomerization and polymerization of ethylene," J. of Organometallic Chemistry 692 (2007) 4580-4592. (Year: 2007).*
Chemical and Engineering News, v.63(5), p. 27 (1985).
Ionkin, A. et al. (2006) "High-Temperature Catalysts for the Production of a-Olefins Based on Iron(II) and IRON(III) Tridentate Bis(imino)pyridine Complexes with Double Pattern of Substitution: ortho-Methyl plus meta-Aryl," Organometallics, v.25(12), 2006, pp. 2978-2992.
Thammavongsy, Z. et al. (2013) "Pyridinediimine Iron Dicarbonyl Complexes with Pendant Lewis Bases and Lewis Acids Located in the Secondary Coordination Sphere," Eur. J. Inorg. Chem., v.2013(22-23), pp. 4008-4015.
Kiernicki, J. J. et al. (2017) "Hydrazine Capture and N—N Bond Cleavage at Iron Enabled by Flexible Appended Lewis Acids," J. Am. Chem. Soc., v.139(50), pp. 18194-18197.
Bradley, D. et al. (2010) "Drying of Organic Solvents: Quantitative Evaluation of the Efficiency of Several Desiccants," J. Org. Chem., v.75, pp. 8351-8354.
Oliveira, J. V. et al. (2000) "High-Pressure Phase Equilibria for Polypropylene-Hydrocarbon Systems," Ind. Eng. Chem. Res., v.39, pp. 4627-4633.
Small, B. et al. (1998) "Highly Active Iron and Cobalt Catalysts for the Polymerization of Ethylene," J. Am. Chem. Soc. (1998), v.120(16), pp. 4049-4050.
Small, B. (2015) "Discovery and Development of Pyridine-bis(imine) and Related Catalysts for Olefin Polymerization and Oligomerization," Acc. Chem. Res., v.48(9), pp. 2599-2611.
Sun, T. et al. (2001) "Effect of Short Chain Branching on the Coil Dimensions of Polyolefins in Dilute Solution," Macromolecules, v.34, pp. 6812-6820.
Szymczak, N., Kiernicki, J. Zeller, M. (2019) "Requirements for Lewis Acid Mediated Capture and N—N Bond Cleavage of Hydrazine at Iron," Inorg. Chem., v.58(2) pp. 1147-1154.

* cited by examiner

Primary Examiner — Fred M Teskin

(57) ABSTRACT

Compositions may comprise symmetrical and asymmetrical pyridine-containing transition metal-complexes having appended group 13 Lewis acids positioned on the pyridine-containing ligands of the transition metal-complex such that the group 13 Lewis acid may be near the catalytic site, thereby allowing the appended group 13 Lewis acid to function more efficiently in promoting formation of a catalytically active species. Catalysts systems may comprise these symmetrical and asymmetrical pyridine-containing transition metal-complexes and methods of preparing polyolefins may use these catalyst systems.

15 Claims, 8 Drawing Sheets

TRANSITION METAL-COMPLEX CATALYSTS HAVING APPENDED GROUP 13 LEWIS ACIDS AND RELATED POLYMERIZATION METHODS

CROSS REFERENCE TO RELATED APPLICATIONS

This application claims the benefit of and priority to U.S. Provisional Application No. 63/018,653 filed May 1, 2020, the disclosure of which is incorporated herein by reference.

FIELD OF THE INVENTION

The present disclosure relates to transition metal-complexes, catalyst systems comprising said transition metal-complexes, and methods for polymerizing olefins using such catalysts systems.

BACKGROUND

Polyolefins are widely used commercially because of their robust physical properties. For example, various types of polyethylenes, including high density, low density, and linear low density polyethylenes, are some of the most commercially useful. Polyethylenes with a higher density and higher molecular weight are valued in film applications requiring high stiffness, good toughness and high throughput. High density polyethylenes ("HDPEs") can be produced by a number of different processes yielding polyethylenes typically having densities greater than 0.940 g/cm$^3$.

Polyolefin compositions having a bimodal molecular weight distribution are desirable for some applications because said polymers combine the advantageous mechanical properties of a high molecular weight fraction of the composition with the improved processing properties of a low molecular weight fraction of the composition. For example, useful bimodal polyolefin compositions include a first polyolefin having low molecular weight, which allows for improved processing, and a second polyolefin having a high molecular weight, which contributes to desired mechanical properties. There are several methods for producing bimodal polyolefins (e.g., melt blending, polymerization in reactors in series or parallel configuration, or single reactor with bimetallic catalysts). However, these methods suffer from various disadvantages including the need for complete homogenization of polyolefin compositions and the high cost associated with these methods.

Polyolefins are typically prepared with catalysts that polymerize olefin monomers. A number of catalysts have been developed for preparing polyolefins. The choice of catalyst may aid in tailoring various polyolefin properties, such as molecular weight, branching, tacticity, crystallinity, melt index, and similar features. Catalysts for olefin polymerization are often based on metallocenes as catalyst precursors, which are activated either with the help of an alumoxane, or with an activator containing a non-coordinating anion. Bimodal polyolefins have been prepared in mixed catalyst systems using, for example, two different metallocene catalysts. However, these may interfere with the polymerization catalysis of each other, resulting in reduced catalytic activity, reduced molecular weight polyolefins, reduced comonomer incorporation, and potential fouling. Other transition metal catalysts have been used based on pyridine-containing ligands. However, these transition metal catalysts suffer from poor solubility and lower activities relative to metallocene catalysts.

There exists a need for catalyst systems that provide polyolefin compositions having novel combinations of comonomer content fractions and molecular weights.

SUMMARY

The present disclosure relates to transition metal-complexes having appended group 13 Lewis acids, catalyst systems comprising said transition metal-complexes, and methods for polymerizing olefins using such catalysts systems.

Compositions described herein may comprise a transition metal-complex having a structure of Formula (1), Formula (2), or Formula (3):

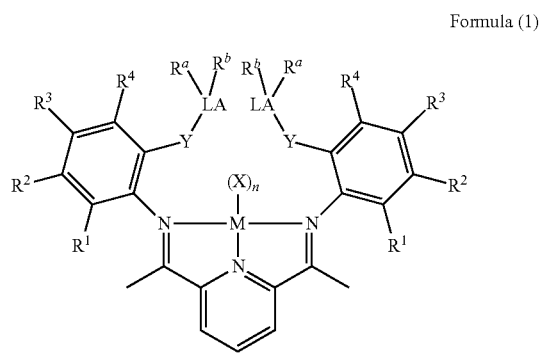

Formula (1)

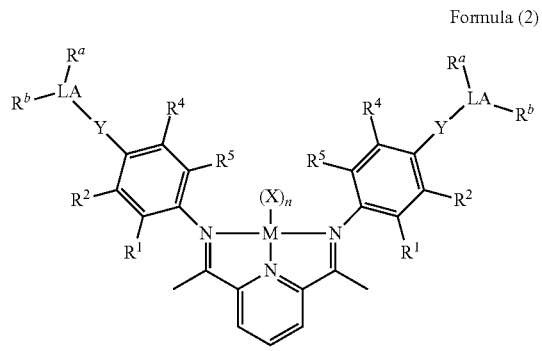

Formula (2)

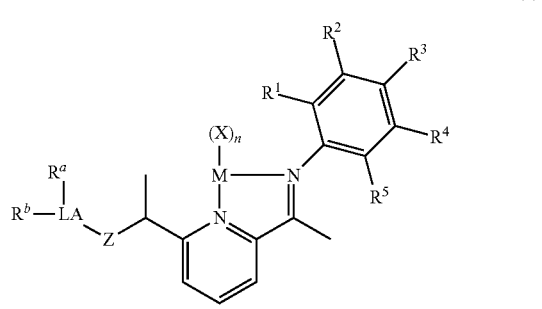

Formula (3)

wherein M is a group 6-10 transition metal; X is a monovalent anionic ligand; n is 2 or 3; $R^1$, $R^2$, $R^3$, $R^4$, and $R^5$ are independently hydrogen or alkyl groups, where the alkyl groups have 1 to 10 carbons; Y is $(CR'R'')_m$ where R' and R'' are independently hydrogen or $C_1$-$C_{10}$, optionally substituted, alkyl groups and m is an integer ranging from 0 to 10; Z is an oxygen; LA is a group 13 Lewis acid; and $R^a$ and $R^b$ are independently hydrocarbyl, substituted hydrocarbyl, halocarbyl, substituted halocarbyl, aryl, substituted aryl, heteroaryl, substituted heteroaryl, alkoxy, substituted alkoxy, or both $R^a$ and $R^b$ are hydrocarbyl, substituted hydrocarbyl, alkoxy, or substituted alkoxy groups joined and bound to the group 13 Lewis acid to form a ring structure comprising acyclic group, a spirocyclic group, a bicyclic group, a fused bicyclic group, or a bridged bicyclic group.

Catalyst systems described herein may comprise at least one activator; and a transition metal-complex having a structure of Formula (1), Formula (2), or Formula (3), defined above, or a reaction product of the transition metal-complex with the at least one activator.

Polymerization methods disclosed herein may comprise contacting the catalyst systems described herein with at least one olefin under polymerization reaction conditions; and obtaining a polyolefin.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

Figure 1:
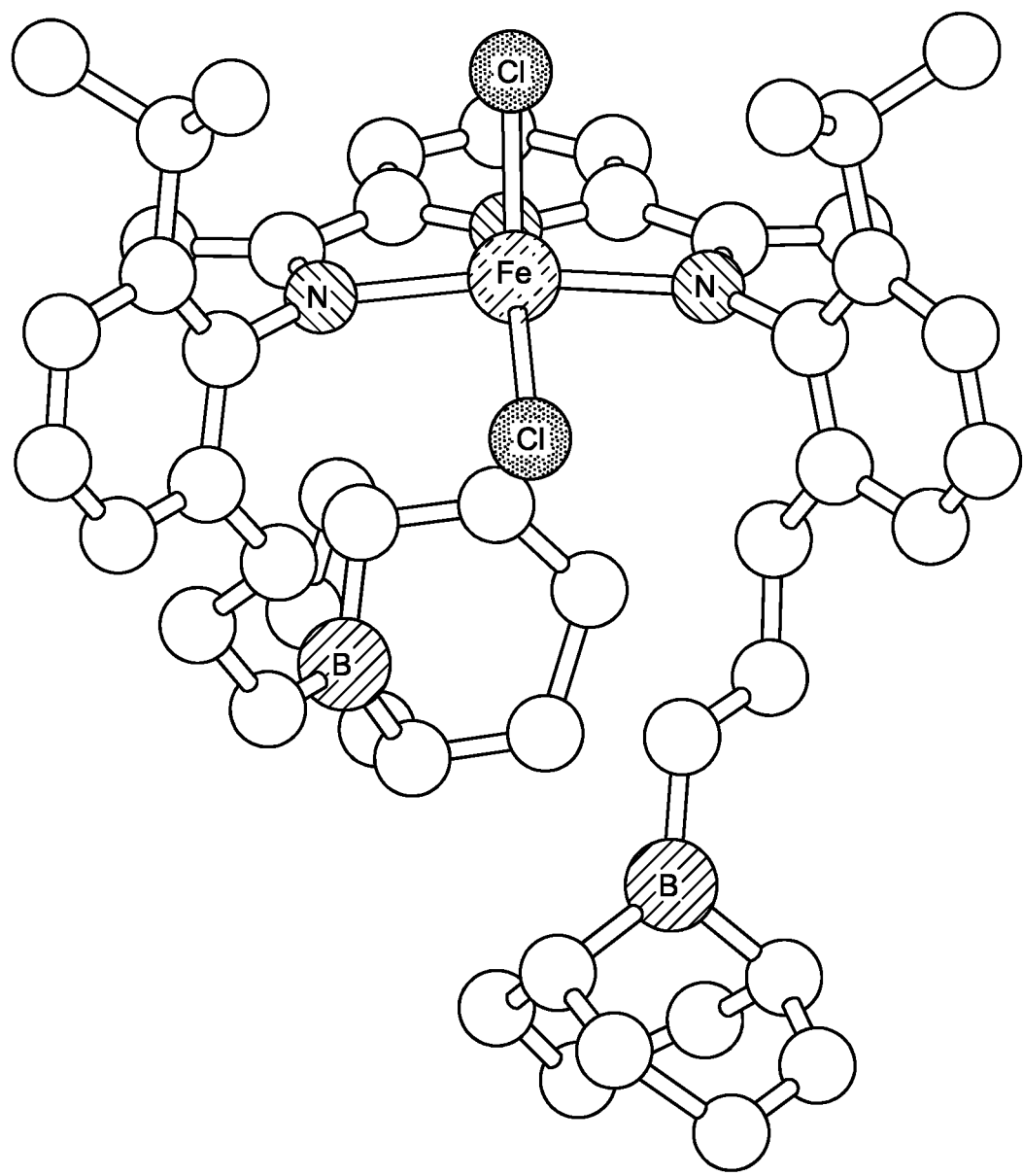
FIG. 1 is a representation of the crystalline structure of iron complex N(E),N(E)-(2,6-pyridinediyldiethylidyne)bis (2-(9-borabicyclo[3.3.1]nonane-9-propyl)-6-isopropyl-benzenamine) (5).

This application relates to transition metal-complexes having appended group 13 Lewis acids, catalyst systems comprising these transition metal-complexes, and methods for polymerizing olefins using such catalysts systems.

Compositions comprising transition metal-complexes having group 13 Lewis acid ligands appended covalently thereto are described in various embodiments of the present disclosure. The term "Lewis acid" may be used synonymously herein with the term "electron pair acceptor." The transition metal-complexes described herein may be rendered active toward promoting olefin polymerization in the presence of a suitable activator, such as aluminum compounds (e.g., alkyl aluminum compounds or alumoxanes), boranes, or borates. Although any transition metal may be present, iron and cobalt transition metal-complexes based on pyridine-containing organic ligands having a moiety containing a group 13 Lewis acid covalently appended thereto can be especially desirable for promoting olefin polymerization reactions.

The group 13 Lewis acid moieties covalently bonded to a pyridine-containing ligand in the transition metal-complexes of the present disclosure bear some structural and functional similarities to the activator substances that are presently employed for activating transition metal-complexes toward olefin polymerization. Advantageously, by suitably appending a group 13 Lewis acid moiety covalently to a transition metal-complexes, the group 13 Lewis acid may be used more efficiently for promoting formation of an active catalytic species. In some instances, the group 13 Lewis acid is positioned on the pyridine-containing ligand of the transition metal-complex such that the group 13 Lewis acid occupies the secondary coordination sphere of the complex. More particularly, the group 13 Lewis acid moieties may be positioned on the ligand to position the group 13 Lewis acid near the catalytic site at the transition metal center, thereby allowing the appended group 13 Lewis acid to function more efficiently in promoting formation of a catalytically active species as compared to a separately added activator. In some instances, the disposition of the group 13 Lewis acid may even open the possibility of the transition metal-complexes becoming self-activated during an olefin polymerization process. In some or other embodiments, the transition metal-complexes disclosed herein allow smaller amounts of additional activator to be used for promoting formation of an active catalytic species. Thus, the covalently appended group 13 Lewis acid in the transition metal-complexes of the present disclosure may allow an externally added activator, such as an alumoxane, borane or borate, to be utilized more effectively.

In addition, by incorporating a group 13 Lewis acid functionality directly within a transition metal-complex, as in the present disclosure, poor solubility associated with pyridine-based transition metal transition metal-complexes during a polymerization reaction may be more effectively addressed, by synthetically modifying the outer functionality of these complexes. By providing an appended group 13 Lewis acid functionality to the pyridine-based ligands as catalysts in a polymerization process, improved solubility and resulting polymer properties may be realized. Further, syntheses of the transition metal-complexes disclosed herein may be conducted readily at high yields in few synthetic steps, thereby providing effective utilization of highly reactive and potentially costly reagents employed for introducing a group 13 Lewis acid into the transition metal-complexes.

The specification describes catalysts that can be transition metal transition metal-complexes. The term transition metal-complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

Definitions and Test Methods

All numerical values within the detailed description and the claims herein are modified by "about" or "approximately" with respect to the indicated value, and take into account experimental error and variations that would be expected by a person having ordinary skill in the art.

Unless otherwise indicated, room temperature is about 23° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

For the purposes of the present disclosure, the new numbering scheme for Groups of the Periodic Table is used as described in *Chemical and Engineering News*, v. 63(5), pg. 27 (1985). In said numbering scheme, the groups (columns) are numbered sequentially from left to right from 1 through 18, excluding the f-block elements (lanthanides and actinides).

The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "Cn" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic.

The terms "linear" or "linear hydrocarbon" refer to a hydrocarbon or hydrocarbyl group having a continuous carbon chain without side chain branching, in which the continuous carbon chain may be optionally-substituted.

The terms "cyclic" or "cyclic hydrocarbon" refer to a hydrocarbon or hydrocarbyl group having a closed carbon ring, which may be optionally-substituted.

The terms "branched" or "branched hydrocarbon" refer to a hydrocarbon or hydrocarbyl group having a linear carbon chain or a closed carbon ring, in which a hydrocarbyl side chain extends from the linear carbon chain or the closed carbon ring. Optional substitution may be present in the linear carbon chain, the closed carbon ring, or the hydrocarbyl side chain.

The terms "saturated" or "saturated hydrocarbon" refer to a hydrocarbon or hydrocarbyl group in which all carbon atoms are bonded to four other atoms.

The terms "unsaturated" or "unsaturated hydrocarbon" refer to a hydrocarbon or hydrocarbyl group in which one or more carbon atoms are bonded to less than four other atoms. That is, the term "unsaturated" refers to a hydrocarbon or hydrocarbyl radical bearing one or more double and/or triple bonds.

The terms "aromatic" or "aromatic hydrocarbon" refer to a hydrocarbon or hydrocarbyl group having a cyclic arrangement of conjugated pi-electrons that satisfy the Hückel rule.

The terms "hydrocarbyl" and "hydrocarbyl group" are used interchangeably herein. The term "hydrocarbyl group" refers to any $C_1$-$C_{20}$ hydrocarbon group bearing at least one unfilled valence position when removed from a parent compound. Suitable "hydrocarbyl" and "hydrocarbyl groups" may be optionally-substituted, in which the term "optionally-substituted" refers to replacement of at least one hydrogen atom or carbon atoms with a heteroatom or heteroatom functional group. Heteroatoms may include, but are not limited to, B, O, N, S, P, F, Cl, Br, I, Si, Pb, Ge, Sn, As, Sb, Se, and Te. Heteroatom functional groups that may be present in substituted hydrocarbyl groups include, but are not limited to, functional groups such as O, S, S=O, $S(=O)_2$, $NO_2$, F, Cl, Br, I, $NR_2$, OR, SeR, TeR, $PR_2$, $AsR_2$, $SbR_2$, SR, $BR_2$, $SiR_3$, $GeR_3$, $SnR_3$, $PbR_3$, where R is a hydrocarbyl group or H. Suitable hydrocarbyl groups may include alkyl, alkenyl, alkynyl, aryl, heteroaryl, cycloalkyl, heterocycle, and the like, any of which may be optionally-substituted.

The term "hydrocarbyl group having 1 to about 20 carbon atoms" may refer to an optionally-substituted moiety selected from a linear or branched $C_1$-$C_{20}$ alkyl, a $C_3$-$C_{20}$ cycloalkyl, a $C_6$-$C_{20}$ aryl, a $C_2$-$C_{20}$ heteroaryl, a $C_1$-$C_{20}$ alkylaryl, a $C_7$-$C_{20}$ arylalkyl, and any combinations thereof.

The terms "alkyl radical," and "alkyl" are used interchangeably throughout this application. For purposes of this application, "alkyl radicals" are defined to be $C_1$-$C_{100}$ alkyls that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —$NR^*_2$, —OR*, —SeR*, —TeR*, —$PR^*_2$, —$AsR^*_2$, —$SbR^*_2$, —SR*, —$BR^*_2$, —SiR*, —$SiR^*_3$, —GeR*, —$GeR^*_3$, —SnR*, —$SnR^*_3$, —$PbR^*_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring.

The term "alkoxy", "alkoxyl", or "alkoxide" mean an alkyl group bound to an oxygen atom, such as an alkyl ether or aryl ether group/radical and can include those where the alkyl group is a $C_1$ to $C_{10}$ hydrocarbyl. The alkyl group may be straight chain, branched, or cyclic. The alkyl group may be saturated or unsaturated. Examples of suitable alkoxy and radicals can include methoxy, ethoxy, n-propoxy, iso-propoxy, n-butoxy, iso-butoxy, sec-butoxy, tert-butoxy, and the like.

The term "aryloxy" or "aryloxide" means an aryl group bound to an oxygen atom, such as an aryl ether group/radical wherein the term aryl is as defined herein. Examples of suitable aryloxy radicals can include phenoxyl, and the like.

The term "aryl" or "aryl group" means a carbon-containing aromatic ring such as phenyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic moieties that have similar properties and structures (nearly planar) to aromatic heterocyclic ligands, but are not by definition aromatic.

Heterocyclic means a cyclic group where a ring carbon atom (or two or three ring carbon atoms) has been replaced with a heteroatom, such as N, O, or S. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylaminophenyl is a heteroatom substituted ring.

Substituted heterocyclic means a heterocyclic group where at least one hydrogen atom of the heterocyclic radical has been substituted with at least a non-hydrogen group, such as a hydrocarbyl group, a heteroatom, or a heteroatom containing group, such as halogen (such as Br, Cl, F or I) or at least one functional group such as $-NR^*_2$, $-OR^*$, $-SeR^*$, $-TeR^*$, $-PR^*_2$, $-AsR^*_2$, $-SbR^*_2$, $-SR^*$, $-BR^*_2$, $-SiR^*$, $-SiR^*_3$, $-GeR^*$, $-GeR^*_3$, $-SnR^*$, $-SnR^*_3$, $-PbR^*_3$, and the like, where each R* is independently a hydrocarbyl or halocarbyl radical.

A substituted aryl is an aryl group where at least one hydrogen atom of the aryl radical has been substituted with at least a non-hydrogen group, such as a hydrocarbyl group, a heteroatom, or a heteroatom containing group, such as halogen (such as Br, Cl, F or I) or at least one functional group such as $-NR^*_2$, $-OR^*$, $-SeR^*$, $-TeR^*$, $-PR^*_2$, $-AsR^*_2$, $-SbR^*_2$, $-SR^*$, $-BR^*_2$, $-SiR^*$, $-SiR^*_3$, $-GeR^*$, $-GeR^*_3$, $-SnR^*$, $-SnR^*_3$, $-PbR^*_3$, and the like, where each R* is independently a hydrocarbyl or halocarbyl radical, and two or more R* may join together to form a substituted or unsubstituted saturated, partially unsaturated or aromatic cyclic or polycyclic ring structure, or where at least one heteroatom has been inserted within a hydrocarbyl ring, for example 3,5-dimethylphenyl is a substituted aryl group.

The term "perfluoroalkyl" refers to an alkyl group that has at least a majority of its hydrogen atoms replaced with fluorine atoms, and more typically all of its hydrogen atoms replaced with fluorine atoms.

The term "perfluoroaryl" refers to an aryl group that has at least a majority of its hydrogen atoms replaced with fluorine atoms, and more typically all of its hydrogen atoms replaced with fluorine atoms.

Examples of saturated hydrocarbyl groups include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, including their substituted analogues. Examples of unsaturated hydrocarbyl groups include, but are not limited to, ethenyl, propenyl, allyl, 1,4-butadienyl, cyclopropenyl, cyclobutenyl, cyclopentenyl, cyclohexenyl, cyclooctenyl and the like including their substituted analogues.

Examples of aromatic hydrocarbyl groups include, but are not limited to, phenyl, tolyl, xylyl, naphthyl, and the like. Heteroaryl and polynuclear heteroaryl groups may include, but are not limited to, pyridine, quinoline, isoquinoline, pyrimidine, quinazoline, acridine, pyrazine, quinoxaline, imidazole, benzimidazole, pyrazole, benzopyrazole, oxazole, benzoxazole, isoxazole, benzisoxazole, imidazoline, thiophene, benzothiophene, furan and benzofuran. Polynuclear aryl groups may include, but are not limited to, naphthalene, anthracene, indane, indene, and tetralin.

The term "transition metal" refers to any atom from groups 3-12 of the Periodic Table, inclusive of the lanthanides and actinide elements.

For purposes of the present disclosure, a "catalyst system" is a combination of at least one catalyst compound, an activator, and an optional support material. The catalyst systems may further comprise one or more additional catalyst compounds. For the purposes of the present disclosure, when catalyst systems are described as comprising neutral stable forms of the components, it is well understood by one of ordinary skill in the art, that the ionic form of the component is the form that reacts with the monomers to produce polymers.

"Complex" as used herein, is also often referred to as catalyst precursor, precatalyst, catalyst, catalyst compound, transition metal compound, or transition metal complex. These words are used interchangeably.

In the description herein, a catalyst may be described as a catalyst precursor, a precatalyst compound, a catalyst compound or a transition metal compound, and these terms are used interchangeably. A polymerization catalyst system is a catalyst system that can polymerize monomers into polymer. An "anionic ligand" is a negatively charged ligand which donates one or more pairs of electrons to a metal ion. A "neutral donor ligand" is a neutrally charged ligand which donates one or more pairs of electrons to a metal ion.

An "olefin," alternatively referred to as "alkene," is a linear, branched, or cyclic compound of carbon and hydrogen having at least one double bond.

A "polymer" has two or more of the same or different mer units. A "homopolymer" is a polymer having mer units that are the same. The term "polymer" as used herein includes, but is not limited to, homopolymers, copolymers, terpolymers, etc. The term "polymer" as used herein also includes impact, block, graft, random, and alternating copolymers. The term "polymer" shall further include all possible geometrical configurations unless otherwise specifically stated. Such configurations may include isotactic, syndiotactic, and random symmetries.

As used herein, unless specified otherwise, the term "copolymer(s)" refers to polymers formed by the polymerization of at least two different monomers (i.e., mer units). For example, the term "copolymer" includes the copolymerization reaction product of propylene and an alpha-olefin, such as ethylene, 1-hexene. A "terpolymer" is a polymer having three mer units that are different from each other. Thus, the term "copolymer" is also inclusive terpolymers and tetrapolymers, such as, for example, the copolymerization product of a mixture of ethylene, propylene, 1-hexene, and 1-octene.

"Different" as used to refer to monomer mer units indicates that the mer units differ from each other by at least one atom or are different isomerically. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on. For purposes of this invention, a polyethylene is an ethylene polymer.

As used herein, when a polymer is referred to as "comprising, consisting of, or consisting essentially of" a monomer, the monomer is present in the polymer in the polymerized/derivative form of the monomer. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

The term "continuous" means a system that operates without interruption or cessation for a period of time, such as where reactants are continually fed into a reaction zone and products are continually or regularly withdrawn without stopping the reaction in the reaction zone. For example, a continuous process to produce a polymer would be one where the reactants are continually introduced into one or more reactors and polymer product is continually withdrawn.

A "solution polymerization" means a polymerization process in which the polymerization is conducted in a liquid polymerization medium, such as an inert solvent or monomer(s) or their blends. A solution polymerization is typically homogeneous. A homogeneous polymerization is one where the polymer product is dissolved in the polymerization medium. Such systems are typically not turbid as described in Oliveira, J. V. et al. High-Pressure Phase Equilibria for Polypropylene-Hydrocarbon Systems, *Ind. Eng. Chem. Res.* 2000, v. 39, pp. 4627-4633.

A bulk polymerization means a polymerization process in which the monomers and/or comonomers being polymerized are used as a solvent or diluent using little or no inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

Unless otherwise noted all melt temperatures (Tm) are DSC second melt and are determined using rapid DSC.

Density, reported in g/cm$^3$, is determined in accordance with ASTM 1505-10 (the plaque is and molded according to ASTM D4703-10a, procedure C, plaque preparation, including that the plaque is conditioned for at least forty hours at 23° C. to approach equilibrium crystallinity), where the measurement for density is made in a density gradient column.

As used herein, Mn is number average molecular weight, Mw is weight average molecular weight, and Mz is z-average molecular weight. Polydispersity index (PDI) is defined to be Mw divided by Mn. Unless otherwise noted, all molecular weights (e.g., Mw, Mn, Mz) are reported in units of g/mol.

Polymerization Procedure

Ethylene polymerizations were carried out under high-throughput conditions according to the following general procedure. A pre-weighed glass vial insert and disposable stirring paddle were fitted to each reaction vessel of the reactor, which contains 48 individual reaction vessels. The reactor was then closed and ethylene gas was introduced at a desired pressure. Then solvent (typically the isohexane) was added to bring the total reaction volume, including the subsequent additions, to 5 mL and the reactor vessels were heated to their set temperature (usually from about 50° C. to about 110° C.). The contents of the vessel were stirred at 800 rpm. An activator solution (typically 100-1000 molar equivalents of methyl alumoxane (MAO) in toluene) was then injected into the reaction vessel along with 500 microliters of toluene, followed by addition of 1-octene (typically 20-160 µL). Catalyst (typically 0.50 mM in toluene, such as 20-40 nmol of catalyst) and another aliquot of toluene (500 microliters) were then added to initiate the reaction. Equivalence is determined based on the mol equivalents relative to the moles of the transition metal in the catalyst complex. The reaction was then allowed to proceed until a pre-determined amount of pressure had been taken up by the reaction. Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point.

GPC Procedure

To determine various molecular weight related values by GPC, high temperature size 5 exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388, each of which is fully incorporated herein by reference for US purposes. This apparatus has a series of three 30 cm×7.5 mm linear columns, each containing PLgel 10 µm, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector (as shown by the examples in Table 3) or Polymer Char IR4 detector. The molecular weights presented are relative to linear polystyrene standards and are uncorrected.

DSC Procedure

For the high throughput samples, the melting temperature (T$_m$) was measured using Differential Scanning Calorimetry (DSC) using commercially available equipment such as a TA Instruments TA-Q200 DSC. Typically, 5 to 10 mg of molded polymer or plasticized polymer is sealed in an aluminum pan and loaded into the instrument at about room temperature. Samples were pre-annealed at about 220° C. for about 15 minutes and then allowed to cool to about room temperature overnight. The samples were then heated to about 220° C. at a heating rate of about 100° C./min, held at this temperature for at least about 5 minutes, and then cooled at a rate of about 50° C./min to a temperature typically at least about 50° C. below the crystallization temperature. Melting points were collected during the heating period.

Polymerization Procedure for Autoclave.

In each case, a 2 L autoclave was heated to about 110° C. and purged with N$_2$ for at least 30 minutes. It was charged with one of the supported mixed catalysts made according to Example 22, and then purged with $N_2$ for at least another 30 minutes. Ethylene was introduced into the reactor at a pressure of 220 psig, and 1-hexene was fed into the reactor as a ratio to ethylene flow (~0.1 g/g). Comonomer flows were maintained over the course of the run at approximately constant pressure in the reactor. A mixture of $H_2$ and $N_2$ was flowed into reactor (120 SCCM; 10% $H_2$ in $N_2$) while stirring the bed, with hydrogen being fed to the reactor as a ratio to ethylene flow (~0.5 mg/g). The hydrogen and ethylene ratios were measured by online GC analysis. Polymerizations were halted after 1 hour by venting the reactor, cooling to room temperature then exposing to air. The polymer product was isolated by washing with water twice, filtration, briefly washed with acetone, and dried in air for at least two days.

GPC-4D Procedure

Unless otherwise indicated, the distribution and the moments of molecular weight (Mw, Mn, Mz, Mw/Mn, etc.), the comonomer content, and the branching index (g') are determined by using a high temperature Gel Permeation Chromatography (Polymer Char GPC-IR) equipped with a multiple-channel band-filter based Infrared detector IR5 with a multiple-channel band filter based infrared detector ensemble IR5 with band region covering from about 2,700 $cm^{-1}$ to about 3,000 $cm^{-1}$ (representing saturated C—H stretching vibration), an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 mL/min, and the nominal injection volume is 200 μL. The whole system including transfer lines, columns, and detectors is contained in an oven maintained at 145° C. The polymer sample is weighed and sealed in a standard vial with 80-μL flow marker (heptane) added to it. After loading the vial in the auto-sampler, polymer is dissolved in the instrument with 8 mL added TCB solvent. The polymer is dissolved at 160° C. with continuous shaking for about 1 hour for polyethylene samples or about 2 hours for polypropylene samples. The TCB densities used in concentration calculation is 1.463 g/ml at room temperature and 1.284 g/mL at 145° C. The sample solution concentration is from 0.2 to 2.0 mg/mL, with lower concentrations being used for higher molecular weight samples. The concentration (c), at each point in the chromatogram is calculated from the baseline-subtracted IR5 broadband signal intensity (I), using the following equation: $c=\beta I$, where $\beta$ is the mass constant. The mass recovery can be calculated from the ratio of the integrated area of the concentration chromatography over elution volume and the injection mass, which is equal to the pre-determined concentration multiplied by injection loop volume. The conventional molecular weight (IR molecular weight) is determined by combining universal calibration relationship with the column calibration, which is performed with a series of monodispersed polystyrene (PS) standards ranging from 700 to 10,000,000 gm/mole. The molecular weight at each elution volume is calculated according to Eq. 1:

$$\log M = \frac{\log(K_{PS}/K)}{a+1} + \frac{a_{PS}+1}{a+1}\log M_{PS} \quad \text{Eq. 1}$$

where the variables with subscript "PS" stand for polystyrene while those without a subscript are for the test samples. In this method, $\alpha_{PS}=0.67$ and $K_{PS}=0.000175$ while a and K for other materials are as calculated and published in literature (Sun, T. et al. Macromolecules 2001, v. 34, pg. 6812), except that for purposes of this invention and claims thereto, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk weight percent of butene comonomer, $\alpha$ is 0.695 and K is $0.000579*(1-0.0075*w2b)$ for ethylene-hexene copolymer where w2b is a bulk weight percent of hexene comonomer, and a is 0.695 and K is $0.000579*(1-0.0077*w2b)$ for ethylene-octene copolymer where w2b is a bulk weight percent of octene comonomer, and $\alpha=0.695$ and $K=0.000579$ for all other linear ethylene polymers. Concentrations are expressed in $g/cm^3$, molecular weight is expressed in g/mole, and intrinsic viscosity (hence K in the Mark-Houwink equation) is expressed in dL/g, unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3/1000TC$) as a function of molecular weight. The short-chain branch (SCB) content per 1000TC (SCB/1000TC) is then computed as a function of molecular weight by applying a chain-end correction to the $CH_3/1000TC$ function, assuming each chain to be linear and terminated by a methyl group at each end. The weight % comonomer is then obtained from Eq. 2 in which f is 0.3, 0.4, 0.6, 0.8, and so on for $C_3$, $C_4$, $C_6$, $C_8$, and so on co-monomers, respectively:

$$w2 = f*SCB/1000TC. \quad \text{Eq. 2}$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained according to Eq. 3:

$$\text{Bulk } IR \text{ ratio} = \frac{\text{Area of } CH_3 \text{ signal within integration limits}}{\text{Area of } CH_2 \text{ signal within integration limits}}. \quad \text{Eq. 3}$$

Then the same calibration of the $CH_3$ and $CH_2$ signal ratio, as mentioned previously in obtaining the $CH_3/1000TC$ as a function of molecular weight, is applied to obtain the bulk $CH_3/1000TC$. A bulk methyl chain ends per 1000TC (bulk $CH_3$end/1000TC) is obtained by weight-averaging the chain-end correction over the molecular-weight range. Then, using these in Eq. 4 and Eq. 5 provide w2b and bulk SBC/1000TC:

$$w2b = f*\text{bulk } CH3/1000TC \quad \text{Eq. 4}$$

$$\text{bulk } SCB/1000TC = \text{bulk } CH3/1000TC - \text{bulk } CH3end/1000TC \quad \text{Eq. 5}$$

Bulk SCB/1000TC is then converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972) according to Eq. 6:

$$\frac{K_o c}{\Delta R(\theta)} = \frac{1}{MP(\theta)} + 2A_2 c \qquad \text{Eq. 6}$$

In Eq. 6, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system from Eq. 7:

$$K_0 = \frac{4\pi^2 n^2 (dn/dc)^2}{\lambda^4 N_A} \qquad \text{Eq. 7}$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1-0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated according to Eq. 8:

$$[\eta]_{avg} = \frac{\sum c_i [\eta]_i}{\sum c_i} \qquad \text{Eq. 8}$$

where the summations are over the chromatographic slices, i, between the integration limits. The branching index $g'_{vis}$ is defined according to Eq. 9:

$$g'_{vis} = \frac{[\eta]_{avg}}{KM_v^\alpha} \qquad \text{Eq. 9}$$

where My is the viscosity-average molecular weight based on molecular weights determined by LS analysis and the K and $\alpha$ are for the reference linear polymer, which are, for purposes of this present disclosure and claims thereto, $\alpha$=0.705 and K=0.0000229 for ethylene-propylene copolymers and ethylene-propylene-diene terpolymers, $\alpha$=0.695 and K=0.000579 for linear ethylene polymers, $\alpha$=0.705 and K=0.0002288 for linear propylene polymers, $\alpha$=0.695 and K=0.000181 for linear butene polymers. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

Polymerization Procedure for High Throughput Examples

Ethylene polymerizations were carried out under high-throughput conditions according to the following general procedure. A pre-weighed glass vial insert and disposable stirring paddle were fitted to each reaction vessel of the reactor, which contains 48 individual reaction vessels. The reactor was then closed and ethylene gas was introduced at a desired pressure. Then solvent (typically the isohexane) was added to bring the total reaction volume, including the subsequent additions, to 5 mL and the reactor vessels were heated to their set temperature (usually from about 50° C. to about 110° C.). The contents of the vessel were stirred at 800 rpm. An activator solution (typically 100-1,000 molar equivalents of methyl alumoxane (MAO) in toluene) was then injected into the reaction vessel along with 500 microliters of toluene, followed by optional addition of 1-octene or 1-hexene (typically 20-160 µL). Catalyst (typically 0.50 mM in toluene, such as 20-40 nmol of catalyst) and another aliquot of toluene (500 microliters) were then added to initiate the reaction. Equivalence is determined based on the mol equivalents relative to the moles of the transition metal in the catalyst complex. The reaction was then allowed to proceed until a pre-determined amount of pressure had been taken up by the reaction. Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point.

Rapid GPC Procedure

To determine various molecular weight related values by GPC, high temperature size 5 exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388, each of which is fully incorporated herein by reference for US purposes. This apparatus has a series of three 30 cm×7.5 mm linear columns, each containing PLgel 10 µm, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent.

The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector (as shown by the examples in Table 3) or Polymer Char IR4 detector. The molecular weights presented are relative to linear polystyrene standards and are uncorrected.

DSC Procedure

For the high throughput samples, the melting temperature ($T_m$) was measured using Differential Scanning Calorimetry (DSC) using commercially available equipment such as a TA Instruments TA-Q200 DSC. Typically, 5 to 10 mg of molded polymer or plasticized polymer is sealed in an aluminum pan and loaded into the instrument at about room temperature. Samples were pre-annealed at about 220° C. for about 15 minutes and then allowed to cool to about room temperature overnight. The samples were then heated to about 220° C. at a heating rate of about 100° C./min, held at this temperature for at least about 5 minutes, and then cooled at a rate of about 50° C./min to a temperature typically at least about 50° C. below the crystallization temperature. Melting points were collected during the heating period.

Transition Metal-Complexes

According to various embodiments, compositions comprising transition metal-complexes are described herein. More particularly, the transition metal-complexes have the structure shown in Formula (1), Formula (2), or Formula (3) below.

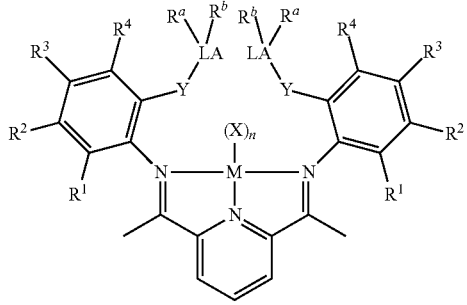

Formula (1)

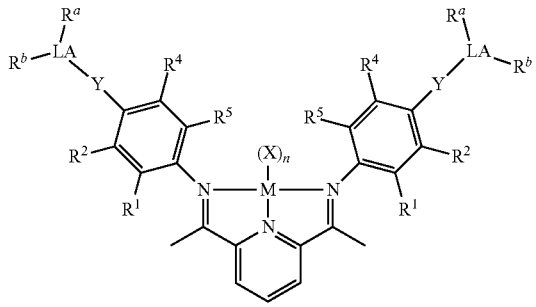

Formula (2)

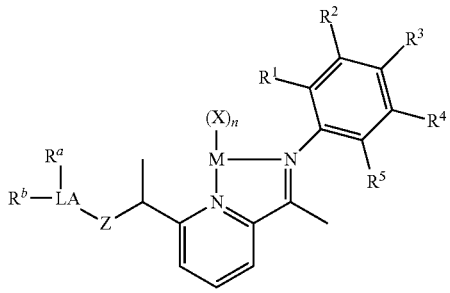

Formula (3)

Referring to Formulas (1), (2), and (3), M is group 6-10 transition metal; X is a monovalent anionic ligand; n is 2 or 3; $R^1$, $R^2$, $R^3$, $R^4$, and $R^5$ are independently hydrogen or alkyl groups, where the alkyl groups have 1 to 10 carbons; Y is $(CR'R'')_m$ where R' and R" are independently hydrogen or $C_1$-$C_{10}$, optionally substituted, alkyl groups and m is an integer ranging from 0 to 10; Z is an oxygen; and LA is a group 13 Lewis acid; and $R^a$ and $R^b$ are independently hydrocarbyl, substituted hydrocarbyl, halocarbyl, substituted halocarbyl, aryl, substituted aryl, heteroaryl, substituted heteroaryl, alkoxy, substituted alkoxy, or both $R^a$ and $R^b$ are hydrocarbyl, substituted hydrocarbyl, alkoxy, or substituted alkoxy groups joined and bound to the Lewis acid to form a ring structure comprising a cyclic group, a spirocyclic group, a bicyclic group, a fused bicyclic group, or a bridged bicyclic group.

Transition metal M in the Formulas (1), (2), and (3) herein is a transition metal that may be selected from group 6, group 7, group 8, group 9, or group 10. In at least some embodiments, M is selected from Cr, Mn, Fe, Co, Ni, Mo, Tc, Ru, Rh, Pd, W, Re, Os, Ir, and Pt. In at least one embodiment, M is Fe, Co, Cr, Mn, and Ni. In at least one embodiment, M is a transition metal selected from groups 8 and 9. In at least one embodiment, M is Fe or Co. In at least one embodiment, M is Fe. The oxidation state of the transition metal atom can range from +1, +2, +3, +4, or +5, for example +2, +3, or +4.

X in the Formulas (1), (2), and (3) herein may be selected from hydrogen, halogen, hydrocarbyl, substituted hydrocarbyl, halocarbyl, substituted halocarbyl, silyl, silylcarbyl, substituted silylcarbyl, germylcarbyl, substituted germylcarbyl, aryl, substituted aryl, alkylaryl, heteroaryl, substituted heteroaryl, alkoxy, substituted alkoxy, aryloxy, substituted aryloxy, boryl, amino, phosphino, ether, thioether, phosphine, amine, carboxylate, alkylthio, arylthio, 1,3-dionate, oxalate, carbonate, nitrate, or sulphate. In at least some embodiments, X is a halogen group. In at least some embodiments, X is a fluorine, chlorine, bromine, or iodine group. In at least some embodiments, X is a chlorine group.

In at least one embodiment, $R^1$, $R^2$, $R^3$, $R^4$, and $R^5$ are independently hydrogen or alkyl (such as alkyl groups having 1 to 10 carbons, such as methyl, ethyl, propyl, butyl, pentyl, hexyl, heptyl, octyl, nonyl, decyl, and isomers thereof). In at least some embodiments, $R^1$, $R^2$, $R^3$, $R^4$, and $R^5$ are independently hydrogen or isopropyl. In at least some embodiments, $R^2$, $R^3$, and $R^4$ are hydrogen. In at least some embodiments, $R^1$ and $R^5$ are isopropyl groups.

In at least one embodiment, Y is a bond. In another embodiment, Y is methyl, ethyl, propyl, butyl, pentyl, hexyl, heptyl, octyl, nonyl, decyl, or an isomer thereof. In at least one embodiment, Y is n-propyl.

Group 13 Lewis acid may be appended to a phenyl group of a pyridine-based ligand through a two-atom or longer chain, including at least two carbon atoms and optionally incorporating heteroatoms and/or branching. According to Formulas 1-2, the two-atom or longer chain may be defined by Y or C—Z, wherein Y and Z are defined as above. In some embodiments, the carbon atom in C—Z is substituted with an alkyl group such as a methyl group. According to more specific embodiments of the present disclosure, Y is $(CH_2)_m$, and m is an integer ranging from 0 to 10. In some embodiments, Z is oxygen. In more specific embodiments of the present disclosure, Y is $(CH_2)_3$.

According to various embodiments of the present disclosure, the group 13 Lewis acid (LA) incorporated in the transition metal-complexes herein may include an atom from group 13 of the Periodic Table. In more particular embodiments, the group 13 Lewis acid may include a boron atom. In more particular embodiments, the group 13 Lewis acid may for a borane group having the formula $R^a$—B—$R^b$. In more particular embodiments, $R^a$ and $R^b$ may be independently hydrocarbyl, substituted hydrocarbyl, halocarbyl, substituted halocarbyl, aryl, substituted aryl, heteroaryl, substituted heteroaryl, alkoxy, substituted alkoxy, or both $R^a$ and $R^b$ are hydrocarbyl, substituted hydrocarbyl, alkoxy, or substituted alkoxy groups joined and bound to the Lewis acid to form a ring structure comprising a cyclic group, a spirocyclic group, a bicyclic group, a fused bicyclic group, or a bridged bicyclic group. In more particular embodiments, $R^a$ and $R^b$ may be independently any of $C_1$ to $C_{20}$ alkyl groups, $C_1$ to $C_{20}$ alkoxy groups, $C_3$ to $C_8$ cycloalkyl groups, $C_6$ to $C_{12}$ aryl groups, $C_7$ to $C_{20}$ alkylaryl groups, $C_1$ to $C_{12}$ haloalkyl groups, $C_6$ to $C_{12}$ haloaryl groups, $C_1$ to $C_{12}$ perfluoroalkyl groups, and $C_6$ to $C_{12}$ perfluoroaryl groups, and the like. In more particular embodiments, $R^a$ and $R^b$ may be joined and bound to the group 13 Lewis acid atom to form a ring structure comprising a cyclic group, a spirocyclic group, a bicyclic group, a fused bicyclic group, or a bridged bicyclic group. In more particular embodiments, $R^a$ and $R^b$ may be joined and bound to the group 13 Lewis acid atom to form a borocycle ring containing from about 3 to about 20 carbon and/or oxygen atoms. In more particular embodiments, the $LA(R^a)(R^b)$ may be bis(norbornyl)borane, pinacolborane, or $B(C_6F_5)_2$.

Accordingly, specific transition metal-complexes encompassed by the present disclosure may be selected from among one or more of the following compounds shown structurally in Formulas (4)-(7) (M=Fe or Co; $R^a$ and $R^b$ defined as above).

Formula (4)

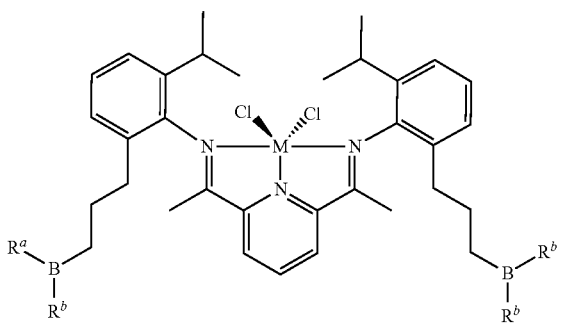

Formula (5)

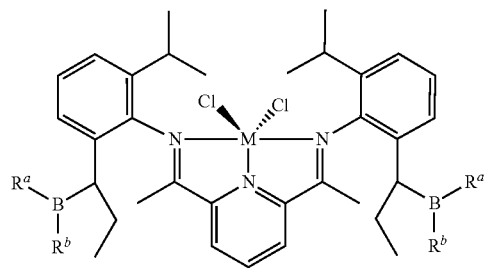

Formula (6)

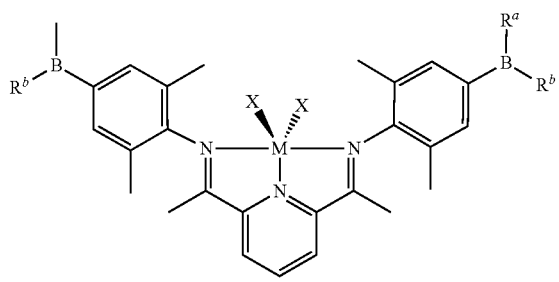

Formula (7)

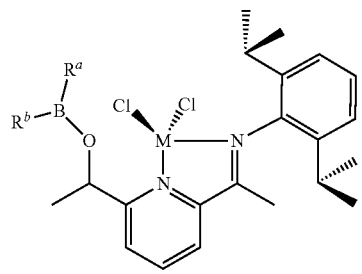

The transition metal-complexes described hereinabove may be synthesized in high yields via a short sequence of synthetic steps, as outlined in brief in Schemes 1 and 2 below.

Scheme 1 depicts the synthesis of transition metal-complexes based on symmetrical bis-imino pyridine catalysts, and Scheme 2 depicts the synthesis of transition metal-complexes based on asymmetrical imino pyridine catalysts.

Scheme 1

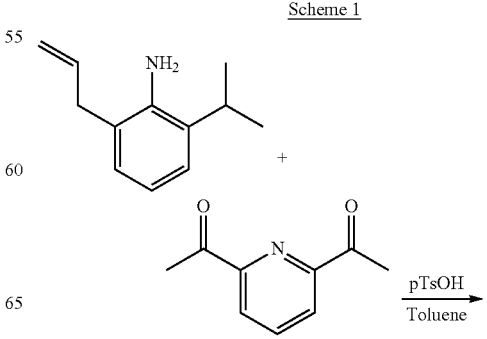

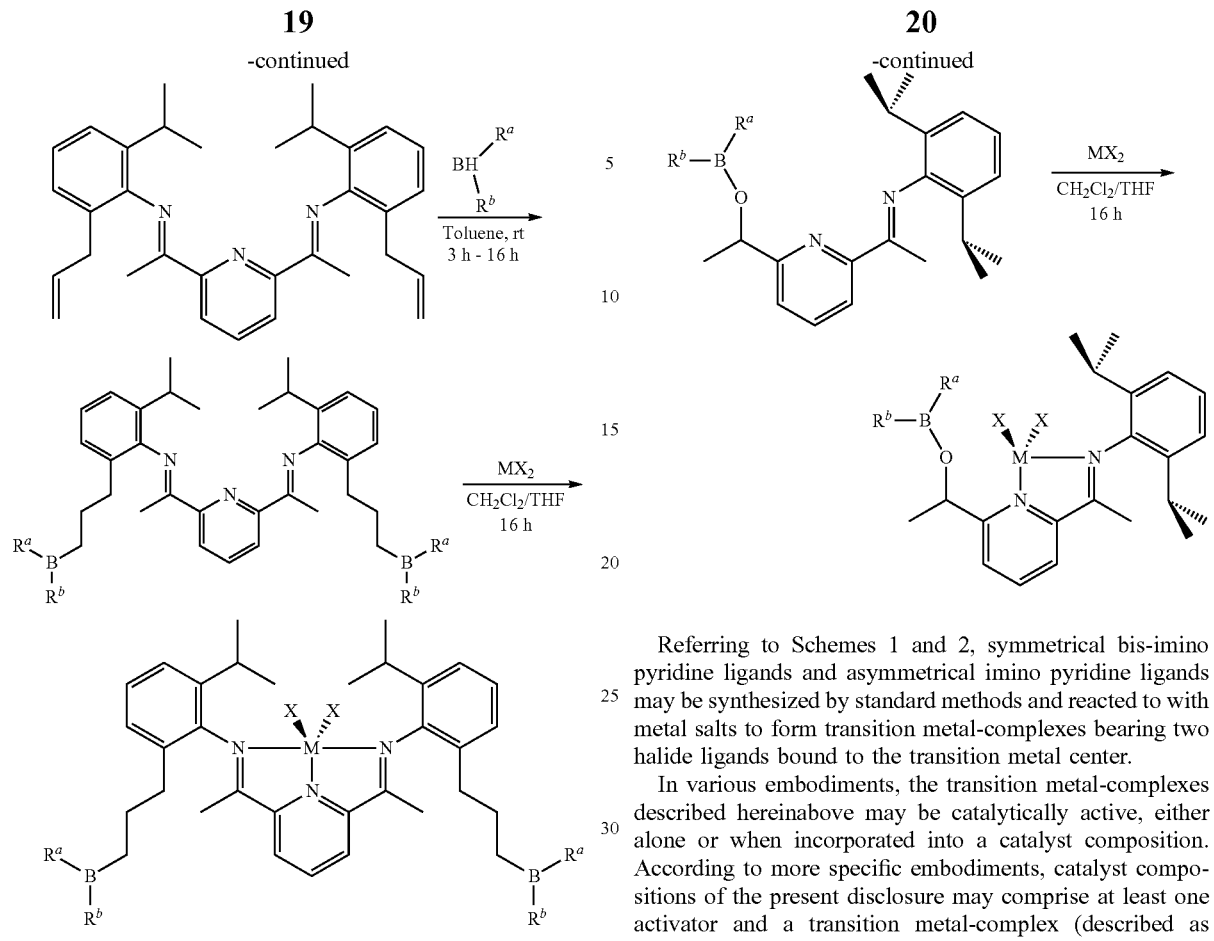

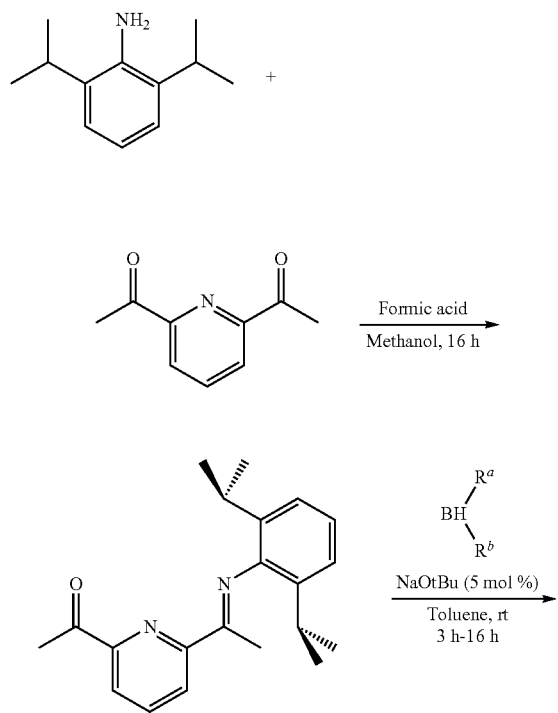

Scheme 2

Referring to Schemes 1 and 2, symmetrical bis-imino pyridine ligands and asymmetrical imino pyridine ligands may be synthesized by standard methods and reacted to with metal salts to form transition metal-complexes bearing two halide ligands bound to the transition metal center.

In various embodiments, the transition metal-complexes described hereinabove may be catalytically active, either alone or when incorporated into a catalyst composition. According to more specific embodiments, catalyst compositions of the present disclosure may comprise at least one activator and a transition metal-complex (described as above) or a reaction product of the transition metal-complex with the at least one activator. Potential reaction products formed by reacting the transition metal-complexes and the at least one activator are not considered to be particularly limited, and it is not necessarily required that the structure of the reaction products be known. Whether a reaction product forms, as well as the structure of the reaction product, may vary depending upon the chemical composition of the activator. In more specific embodiments, the catalyst compositions described herein may be catalytically active for promoting polymerization of an olefinic feed.

According to more specific embodiments, suitable activators for transition metal-complexes of the present disclosure may comprise an alumoxane. Suitable alumoxanes are not considered to be especially limited, provided that they allow a polymerization reaction to occur upon contacting a polymerizable monomer, such as an olefinic feed, as described herein. In more particular embodiments, methylalumoxane may be an especially suitable alumoxane for use in combination with the transition metal-complexes disclosed herein. Other suitable activators for transition metal-complexes that may be present in the transition metal-complexes disclosed herein include borane and borate compounds. Particular borane and borate compounds may include, for example, $B(C_6F_5)_3$, $[PhNMe_2H]^+[B(C_6F_5)_4]^-$, and $[Ph_3C]^+[B(C_6F_5)_4]^-$.

Without being bound by any theory or mechanism, after activation of the transition metal-complexes of the present disclosure, an olefinic monomer may then be bonded to the transition metal center at an open first coordination site. Subsequent bonding of another molecule of the olefinic monomer at an open second coordination site may then allow olefin insertion to take place within the olefin bonded at the first coordination site. The polymer chain may then continue growing as subsequent olefin molecules become bonded and undergo insertion.

In some embodiments, the catalyst compositions of the present disclosure may be disposed on a solid support. The solid support may allow a catalytic reaction, such as polymerization of an olefinic feed, to be conducted under heterogeneous conditions. In more specific embodiments, the solid support may be silica. Other suitable solid supports may include, but are not limited to, alumina, magnesium chloride, talc, inorganic oxides or chlorides including one or more metals from groups 2, 3, 4, 5, 13 or 14 of the Periodic Table, and polymers such as polystyrene, or functionalized and/or crosslinked polymers. Other inorganic oxides that may suitably function as solid supports include, for example, titania, zirconia, boron oxide, zinc oxide, magnesia, or any combination thereof. Combinations of inorganic oxides may be suitably used as solid supports as well. Illustrative combinations of suitable inorganic oxides include, but are not limited to, silica-alumina, silica-titania, silica-zirconia, silica-boron oxide, and the like.

In some embodiments, an alumoxane or other suitable activator may be disposed on silica or another suitable solid support before being combined with the transition metal-complexes disclosed herein. In other embodiments, the transition metal-complexes disclosed herein may be disposed upon silica or another suitable support before being combined with an alumoxane or other suitable activator. Upon combining the activator and the solid support with the transition metal-complexes, the resulting catalyst composition may become disposed upon the solid support. Catalyst compositions having different catalytic properties may be obtained depending upon whether the transition metal-complexes or the activator are supported on the solid support first.

In some embodiments, an alumoxane, such as MAO, may be mixed in an inert solvent such as toluene and then be slurried with a solid support, such as silica. Alumoxane deposition upon the solid support may occur at a temperature between about 60° C. to 120° C., or about 80° C. to 120° C., or about 100° C. to 120° C. Deposition occurring below 60° C., including room temperature deposition, may also be effective.

In some embodiments, suitable solid supports may have a surface area ranging from about 1 m$^2$/g to about 1000 m$^2$/g, or about 5 m$^2$/g to about 900 m$^2$/g, or about 50 m$^2$/g to about 500 m$^2$/g, or about 100 m$^2$/g to about 400 m$^2$/g. In some or other embodiments, the solid support may have a pore volume ranging between about 0.01 cm$^3$/g to about 4 cm$^3$/g, or about 0.1 cm$^3$/g to about 3 cm$^3$/g, or about 0.8 cm$^3$/g to about 3 cm$^3$/g, or about 1 cm$^3$/g to about 2.5 cm$^3$/g. In some or other embodiments, the solid support may have an average particle size ranging from about 0.1 μm low of about 500 μm, or about 0.3 μm to about 400 μm, or about 0.5 μm to about 250 μm, or about 1 μm to about 200 μm, or about 5 μm to about 150 μm, or about 10 μm to about 100 μm.

The amount of activator combined with the transition metal-complex in the catalyst compositions of the present disclosure can widely vary. In various embodiments, the molar amount of the transition metal-complex to the activator can range from about 1:1 to about 100,000:1. For example, the ratio of activator to metallocene can range from about 2:1, about 5:1, about 10:1, about 25:1, about 50:1, or about 100:1, up to about 500:1, about 1000:1, about 5000:1, or about 10,000:1.

Accordingly, in some or other embodiments of the present disclosure, polymerization methods are also described herein. In more specific embodiments, the polymerization methods of the present disclosure may comprise providing an olefinic feed, and contacting a catalyst composition, as defined herein, with the olefinic feed under polymerization reaction conditions.

Suitable polymerization reaction conditions may include, for example, any high-pressure, solution, slurry and/or gas phase polymerization process. According to more specific embodiments, the catalyst compositions may be located in a fixed bed, fluidized bed, ebullated bed, slurry bed, trickle bed, or like reactor system when conducting a polymerization reaction.

In some embodiments, hydrogen gas may be included in the polymerization reaction conditions. The hydrogen gas may influence the properties of the resulting polyolefin polymer, such as altering the melt flow index or molecular weight, compared to an analogous polymerization reaction conducted without the hydrogen gas. The amount of hydrogen gas that is present may also alter these properties as well. According to various embodiments, the molar ratio of hydrogen gas to olefinic feed may range between about 0.0001:1 to about 10000:1. In more specific embodiments, the amount of hydrogen gas may range up to about 5,000 ppm, or up to about 4,000 ppm, or up to about 3,000 ppm, or up to about 2,000 ppm, or up to about 1,000 ppm, or up to about 500 ppm, or up to about 400 ppm, or up to about 300 ppm, or up to about 200 ppm, or up to about 100 ppm, or up to about 50 ppm, or up to about 10 ppm, or up to about 1 ppm.

Any olefinic feed can be polymerized using the catalyst compositions disclosed herein. Suitable olefinic feeds may include any $C_2$-$C_{40}$ alkene, which may be straight chain or branched, cyclic or acyclic, and vinyl-terminal or vinyl-non-terminal, optionally containing heteroatom substitution. In more specific embodiments, the olefinic feed may comprise a $C_2$-$C_{12}$ alkene such, for example, ethene, propene, 1-butene, 2-butene, 1-pentene, cyclopentene, 1-hexene, cyclohexene, 1-octene, 1-decene, or 1-dodecene. Other suitable monomers may include ethylenically unsaturated monomers, diolefins having 4 to 18 carbon atoms, conjugated or nonconjugated dienes, polyenes, vinyl monomers and cyclic olefins. Non-limiting olefinic monomers may also include norbornene, norbornadiene, isobutylene, isoprene, vinylbenzocyclobutane, styrenes, alkyl substituted styrene, ethylidene norbornene, dicyclopentadiene and cyclopentene. The olefinic feed may comprise any single alkene or any mixture of one or more of the foregoing alkenes.

Polymerizations can be performed at any temperature and/or pressure suitable to obtain the desired polymers, such as polyethylene. The polymerization methods of the present disclosure may include polymerization reaction conditions that include temperatures ranging between about 30° C., or about 50° C., or about 100° C. up to the melting point of the polymer produced. In more specific embodiments, the polymerization reaction conditions may include a reaction temperature between about 30° C. and about 150° C., or between about 50° C. and about 150° C., or between about 80° C. and about 150° C., or between about 100° C. and about 150° C. In the specific case of ethylene polymerization, the polymerization reaction may take place at a temperature between about 70° C. and about 110° C. and a pressure of at least about 120 psig (about 0.8 MPa), or about 275 psig to 3,000 psig (about 2 MPa to about 21 MPa), or about 500 psig to about 2,000 psig (about 3 MPa to about 14 MPa). A suitable maximum temperature may be dependent upon the melting point of the polymer produced.

Polymers produced using the transition metal-complexes and polymerization reactions of the present disclosure may be characterized by a range of physical property measurements, as discussed hereinafter.

In a typical polymerization, the run time of the reaction is up to about 300 minutes, or about 5 minutes to about 250 minutes, or about 10 minutes to about 120 minutes.

In at least one embodiment, hydrogen is present in the polymerization reactor at a partial pressure of about 0.001 psig to about 50 psig (about 0.007 kPa to 345 kPa), or about 0.01 psig to 25 psig (about 0.07 kPa to about 172 kPa), or about 0.1 psig to about 10 psig (about 0.7 kPa to about 70 kPa).

In at least one embodiment, the activity of the catalyst is at least about 10 kg polymer/mmol M/hour, or about 10 kg polymer/mmol M/hour to about 2,000 kg polymer/mmol M/hour, or about 10 kg polymer/mmol M/hour to about 250 kg polymer/mmol M/hour, or about 250 kg polymer/mmol M/hour to about 2,000 kg polymer/mmol M/hour. In an alternate embodiment, the conversion of olefin monomer is at least about 10%, based upon polymer yield and the weight of the monomer entering the reaction zone, or about 20% or more, or about 30% or more, or about 50% or more, or about 80% or more.

In some embodiments, polyolefins produced using the catalyst compositions of the present disclosure may have a density ranging from about 0.86 g/cm³ to about 0.97 g/cm³, or about 0.90 g/cm³ to about 0.950 g/cm³, or about 0.905 g/cm³ to about 0.940 g/cm³, or about 0.910 g/cm³ to about 0.930 g/cm³.

In at least one embodiment, a catalyst system of the present disclosure is capable of producing polyolefins, such as polyethylene, having an Mw of about 20,000 g/mol to about 1,000,000 g/mol, or about 20,000 g/mol to about 150,000 g/mol, or about 50,000 g/mol to about 200,000 g/mol, or about 100,000 g/mol to about 500,000 g/mol, or about 250,000 g/mol to about 1,000,000 g/mol.

In at least one embodiment, a catalyst system of the present disclosure is capable of producing polyolefins, such as polyethylene, having a melting temperature (Tm) of about 120° C. to about 140° C., or about 125° C. to about 135° C., or about 130° C. to about 135° C.

In at least one embodiment, a catalyst system of the present disclosure is capable of producing polyolefins, such as polyethylene, having a polydispersity index (PDI) of about 2.0 to about 3.5, or about 2.3 to about 3.2, or about 2.4 to about 3.0.

Processing of the polymers may take place following the polymerization reaction. Suitable processing operations may include, for example, blending or co-extrusion with any other polymer. Non-limiting examples of other polymers include linear low density polyethylenes, elastomers, plastomers, high pressure low density polyethylene, high density polyethylenes, polypropylenes and the like. The polymers formed according to the present disclosure may also be blended with additives to form compositions that can then be used in articles of manufacture. Suitable additives may include antioxidants, nucleating agents, acid scavengers, plasticizers, stabilizers, anticorrosion agents, blowing agents, ultraviolet light absorbers, quenchers, antistatic agents, slip agents, phosphites, phenolics, pigments, dyes and fillers and cure agents such as peroxide.

Examples Embodiments

Embodiments disclosed herein include:
A. Compositions comprising:
a transition metal-complex having a structure of Formula (1), Formula (2), or Formula (3):

Formula (1)

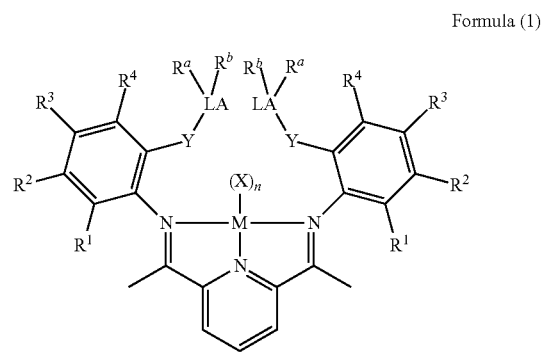

Formula (2)

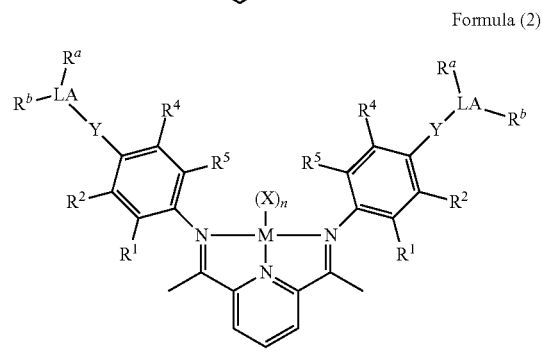

Formula (3)

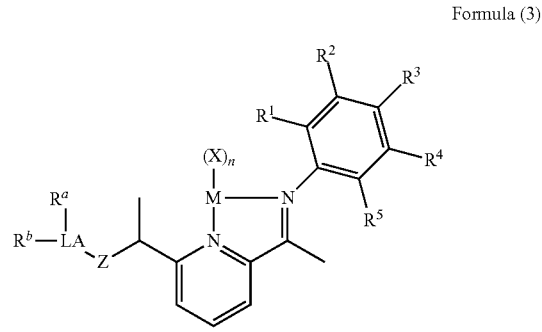

wherein:
M is a group 6-10 transition metal;
X is a monovalent anionic ligand;
n is 2 or 3;
$R^1$, $R^2$, $R^3$, $R^4$, and $R^5$ are independently hydrogen or alkyl groups, where the alkyl groups have 1 to 10 carbons;
Y is $(CR'R'')_m$ where R' and R'' are independently hydrogen or $C_1$-$C_{10}$, optionally substituted, alkyl groups and m is an integer ranging from 0 to 10;
Z is an oxygen;
LA is a group 13 Lewis acid; and
$R^a$ and $R^b$ are independently hydrocarbyl, substituted hydrocarbyl, halocarbyl, substituted halocarbyl, aryl, substituted aryl, heteroaryl, substituted heteroaryl, alkoxy, substituted alkoxy, or both $R^a$ and $R^b$ are hydrocarbyl, substituted hydrocarbyl, alkoxy, or substituted alkoxy groups joined and bound to the group 13 Lewis acid to form a ring structure comprising a cyclic group, a spirocyclic group, a bicyclic group, a fused bicyclic group, or a bridged bicyclic group.

Embodiment A may have one or more of the following additional elements in any combination:

Element 1: wherein LA is boron.

Element 2: wherein the $LA(R^a)(R^b)$ moiety is selected from the group consisting of bis(norbornyl)borane, pinacolborane, and $B(C_6F_5)_2$.

Element 3: wherein M is selected from the group consisting of Fe, Co, Cr, Mn, and Ni.

Element 4: wherein X is a halogen group.

Element 5: wherein X is a chlorine group.

Element 6: wherein $R^2$, $R^3$, and $R^4$ are hydrogen.

Element 7: wherein $R^1$ and $R^5$ are isopropyl groups.

Element 8: wherein Y is a propyl group.

Element 9: wherein M is Fe.

B: a catalyst system comprising at least one activator; and the transition metal-complex of Embodiment A, in combination with one or more of Elements 1-9.

Embodiment B may have one or more of the following additional elements in any combination:

Element 10: wherein the at least one activator comprises an alumoxane.

Element 11: wherein the alumoxane is methylalumoxane.

Element 12: wherein the catalyst composition is disposed on a solid support.

C: a method comprising contacting the catalyst system of Embodiment B with at least one olefin under polymerization reaction conditions; and obtaining a polyolefin. The catalyst system of Embodiment B may be in combination with one or more of Elements 10-12.

Embodiment C may have one or more of the following additional elements in any combination:

Element 13: wherein the polyolefin has an Mw of about 20,000 g/mol to about 1,000,000 g/mol.

Element 14: wherein the polyolefin has a melt temperature of about 120° C. to about 140° C.

Element 15: wherein the catalyst system is disposed upon a solid support.

This invention further relates to:

1. A composition comprising:
a transition metal-complex having a structure of Formula (1), Formula (2), or Formula (3):

Formula (1)

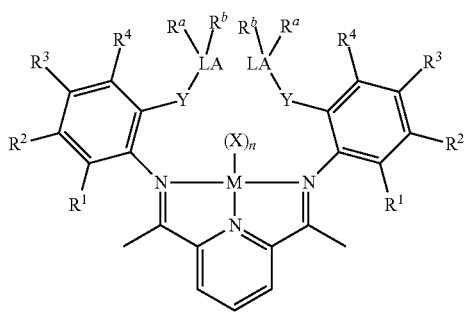

Formula (2)

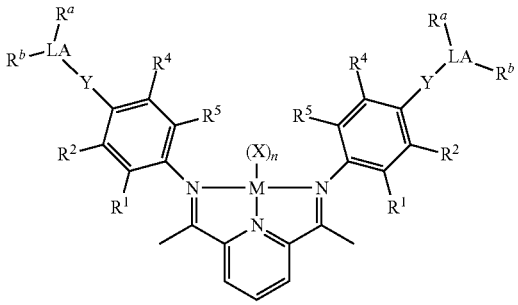

Formula (3)

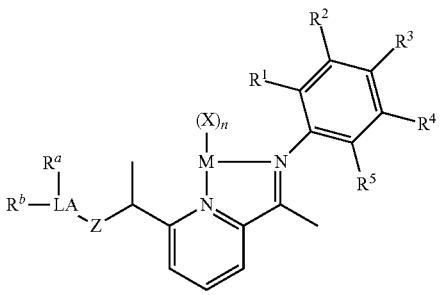

wherein:
M is a group 6-10 transition metal;
X is a monovalent anionic ligand;
n is 2 or 3;
$R^1$, $R^2$, $R^3$, $R^4$, and $R^5$ are independently hydrogen or alkyl groups, where the alkyl groups have 1 to 10 carbons;
Y is $(CR'R'')_m$ where R' and R'' are independently hydrogen or $C_1$-$C_{10}$, optionally substituted, alkyl groups and m is an integer ranging from 0 to 10;
Z is an oxygen;
LA is a group 13 Lewis acid; and
$R^a$ and $R^b$ are independently hydrocarbyl, substituted hydrocarbyl, halocarbyl, substituted halocarbyl, aryl, substituted aryl, heteroaryl, substituted heteroaryl, alkoxy, substituted alkoxy, or both $R^a$ and $R^b$ are hydrocarbyl, substituted hydrocarbyl, alkoxy, or substituted alkoxy groups joined and bound to the group 13 Lewis acid to form a ring structure comprising a cyclic group, a spirocyclic group, a bicyclic group, a fused bicyclic group, or a bridged bicyclic group.

2. The composition of paragraph 1, wherein LA is boron.

3. The composition of paragraph 2, wherein the $LA(R^a)(R^b)$ moiety is selected from the group consisting of bis(norbornyl)borane, pinacolborane, and $B(C_6F_5)_2$.

4. The composition of any one of paragraphs 1-3, wherein M is selected from the group consisting of Fe, Co, Cr, Mn, and Ni.

5. The composition of any one of paragraphs 1-4, wherein X is a halogen group.

6. The composition of paragraph 5, wherein X is a chlorine group.

7. The composition of any one of paragraphs 1-6, wherein $R^2$, $R^3$, and $R^4$ are hydrogen.

8. The composition of any one of paragraphs 1-7, wherein $R^1$ and $R^5$ are isopropyl groups.

9. The composition of any one of paragraphs 1-8, wherein Y is a propyl group.

10. The composition of any one of paragraphs 1-8, wherein M is Fe.

11. A catalyst system comprising:
   at least one activator; and
   a transition metal-complex having a structure of Formula (1), Formula (2), or Formula (3):

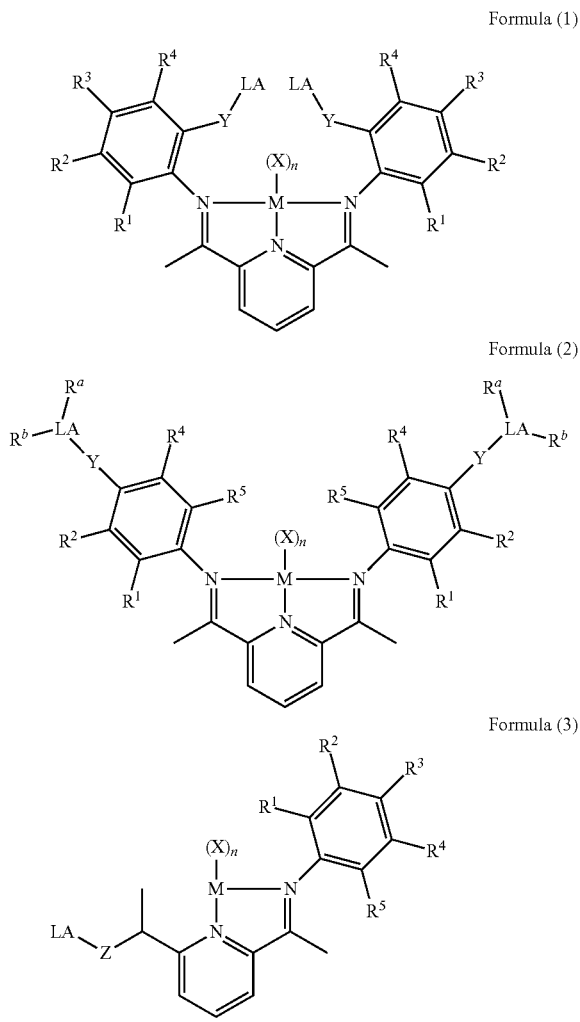

or a reaction product of the transition metal-complex with the at least one activator;
wherein:
   M is a group 6-10 transition metal;
   X is a monovalent anionic ligand;
   n is 2 or 3;
   $R^1$, $R^2$, $R^3$, $R^4$, and $R^5$ are independently hydrogen or alkyl groups, where the alkyl groups have 1 to 10 carbons;
   Y is $(CR'R'')_m$ where R' and R" are independently hydrogen or $C_1$-$C_{10}$, optionally substituted, alkyl groups and m is an integer ranging from 0 to 10;
   Z is an oxygen; and
   LA is a group 13 Lewis acid; and
   $R^a$ and $R^b$ are independently hydrocarbyl, substituted hydrocarbyl, halocarbyl, substituted halocarbyl, aryl, substituted aryl, heteroaryl, substituted heteroaryl, alkoxy, substituted alkoxy, or both $R^a$ and $R^b$ are hydrocarbyl, substituted hydrocarbyl, alkoxy, or substituted alkoxy groups joined and bound to the group 13 Lewis acid to form a ring structure comprising a cyclic group, a spirocyclic group, a bicyclic group, a fused bicyclic group, or a bridged bicyclic group.

12. The catalyst system of paragraph 11, wherein the at least one activator comprises an alumoxane.

13. The catalyst system of paragraph 12, wherein the alumoxane is methylalumoxane.

14. The catalyst system of any one of paragraphs 11-13, wherein the catalyst composition is disposed on a solid support.

15. The catalyst system of any of paragraphs 11-14, wherein LA is a boron.

16. The catalyst system of paragraph 15, wherein the LA($R^a$)($R^b$) moiety is selected from the group consisting of bis(norbornyl)borane, pinacolborane, and $B(C_6F_5)_2$.

17. The catalyst system of any one of paragraphs 11-16, wherein M is selected from the group consisting of Fe, Co, Cr, Mn, and Ni.

18. The catalyst system of any one of paragraphs 11-17, wherein X is a halogen group.

19. The catalyst system of paragraph 18, wherein X is a chlorine group.

20. The catalyst system of any one of paragraphs 11-19, wherein $R^2$, $R^3$, and $R^4$ are hydrogen.

21. The catalyst system of any one of paragraphs 11-20, wherein $R^1$ and $R^3$ are isopropyl groups.

22. The catalyst system of any one of paragraphs 11-21, wherein Y is a propyl group.

23. The catalyst system of any one of paragraphs 11-22, wherein M is Fe.

24. A method comprising:
   contacting the catalyst system of any of paragraphs 11-23 with at least one olefin under polymerization reaction conditions; and
   obtaining a polyolefin.

25. The method of paragraph 24, wherein the at least one olefin comprises ethylene.

26. The method of any one of paragraphs 24-25, wherein the polyolefin has an Mw of about 20,000 g/mol to about 1,000,000 g/mol.

27. The method of any one of paragraphs 24-26, wherein the polyolefin has a melt temperature of about 120° C. to about 140° C.

28. The method of any of paragraphs 23-27, wherein the catalyst system is disposed upon a solid support.

To facilitate a better understanding of the embodiments described herein, the following examples of various representative embodiments are given. In no way should the following examples be read to limit, or to define, the scope of the present disclosure.

EXAMPLES

All manipulations were performed under an inert atmosphere using glove box techniques unless otherwise stated. Benzene-$d_6$, Chloroform-$d_3$ Dichloromethane-$d_2$ (Cambridge Isotopes) were degassed and dried over 3 Å molecular sieves overnight prior to use. 2,6-bisacetylpyridine (TCI chemicals) used as purchased. 2,6-dimethyl-4-bromoaniline, KOAc, bis(pinacolato)diboron, $MgSO_4$ and $FeCl_2$ were purchased from Sigma Aldrich and used as received. Dioxane, diethyl ether, dichloromethane (DCM), toluene and pentane (Sigma Aldrich) were degassed and dried over 3 Å molecular sieves overnight prior to use (D. Bradley, G. Williams, M. Lawton, J. Org. Chem. 2010, v. 75, pg. 8351). PdCl2 (dppf) was purchased from Strem and used as received. Methylaluminoxane was purchased from Grace and used as received. 2-allyl-6-isopropyl-aniline and (E)-1-(6-(1-((2,6-diisopropylphenyl)imino)ethyl)pyridin-2-yl)ethan-1-one were prepared according to slightly modified literature procedures. $^1$H NMR spectra were recorded on a Bruker 400 MHz instrument; the solvent residual resonance was used as an internal reference and chemical shifts were reported in δ (ppm) scale.

Precursor Synthesis of Symmetrical Bis-Imino Pyridine Catalysts. (2,6)-bis(1-(2-allyl-6-isopropylphenylimino)ethyl)pyridine (1)

(2,6)-bis(1-(2-allyl-6-isopropylphenylimino)ethyl)pyridine was synthesized as shown in Scheme 3.

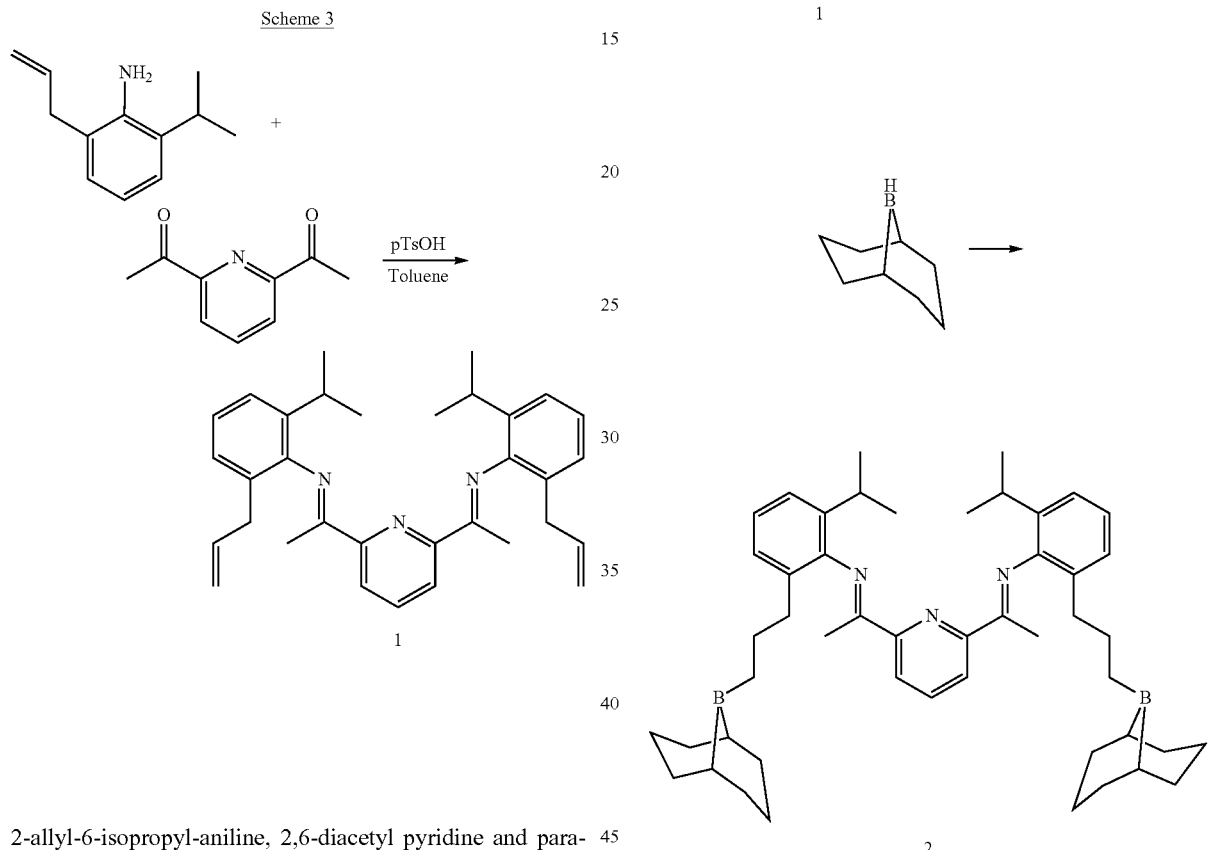

2-allyl-6-isopropyl-aniline, 2,6-diacetyl pyridine and para-toluenesulfonic acid (5 mol %) were dissolved in 40 mL of toluene. This solution was refluxed for 3 days under Dean-Stark conditions. Upon cooling, the solvent was removed in vacuo yielding a brown oil mixture. The mixture was suspended in ethanol and filtered. The (2,6)-bis(1-(2-allyl-6-isopropylphenylimino)ethyl)pyridine product, which is insoluble in ethanol, was collected via filtration and dried in vacuo. The compound was obtained as a faint yellow powder in ca 25% yield. $^1$H NMR (400 MHz, Benzene-d$_6$) δ 8.47 (d, 1H), 7.28 (m, 1H), 7.22 (m, 1H), 7.15 (m, 2H), 7.09 (m, 1H), 5.91 (m, 1H), 4.96 (m, 2H), 3.22 (m, 2H), 2.92 (m, 1H), 2.25 (s, 3H), 1.16 (m, 6H).

Syntheses of Symmetrical Bis-Imino Pyridine Compounds and their Transition Metal-Complexes N(E),N(E)-(2,6-pyridinediyldiethylidyne)bis(2-(9-borabicyclo[3.3.1]nonane-9-propyl)-6-isopropyl-benzenamine) (2). N(E),N(E)-(2,6-pyridinediyldiethylidyne)bis(2-(9-borabicyclo[3.3.1]nonane-9-propyl)-6-isopropyl-benzenamine) was synthesized as shown in Scheme 4.

(2,6)-bis(1-(2-allyl-6-isopropylphenylimino)ethyl)pyridine 1 (1 equivalent) and 9-borabicyclo[3.3.1]nonane (1 equivalent) were suspended in toluene (8 mL) in a 25 mL scintillation vial. The mixture was stirred at room temperature overnight. After 18 hours, an aliquot was analyzed by $^1$H NMR spectroscopy. $^1$H NMR spectroscopy indicates a pure material as the absence of olefinic peaks indicates the desired hydroboration. The solvent was then removed in vacuo to give a spectroscopically pure N(E),N(E)-(2,6-pyridinediyldiethylidyne)bis(2-(9-borabicyclo[3.3.1]nonane-9-propyl)-6-isopropyl-benzenamine) product in quantitative yield. $^1$H NMR (400 MHz, Benzene-d$_6$) δ 8.54 (d, 2H), 7.35 (t, 1H), 7.27-7.19 (m, 4H), 7.14 (m, 2H), 2.96 (m, 2H), 2.55 (m, 4H), 2.33 (s, 6H), 2.00-1.51 (overlapping m, 29H) 1.37 (m, 6H), 1.24 (m, 6H), 1.17 (t, 6H).

N(E),N(E)-(2,6-pyrndinediyldiethylidyne)bis(2-(1,1-(bis(pentafluorophenyl)boryl)propyl)-6-isopropyl-benzenamine) (3). N(E),N(E)-(2,6-pyridinediyldiethylidyne)bis(2-(1,1-(bis(pentafluorophenyl)boryl)propyl)-6-isopropyl-benzenamiine) was synthesized as shown in Scheme 5.

Scheme 5

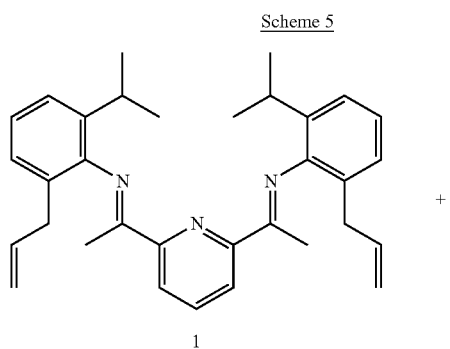

1

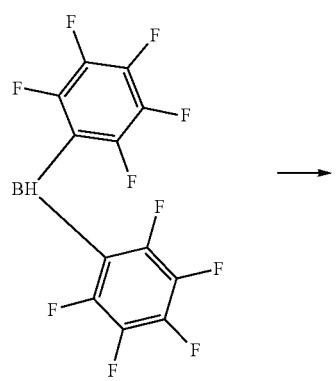

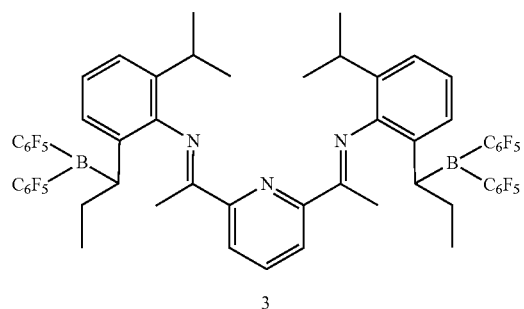

3

(2,6)-bis(1-(2-allyl-6-isopropylphenylimiino)ethyl)pyridine 1 (1 equivalent) and HB(C$_6$F$_5$)$_2$ (0.5 equivalent) were suspended in toluene. The reaction mixture was stirred overnight. After solvent removal, the residual solid was briefly washed with minimal hexane and dried in vacuo. $^1$H NMR and $^{19}$F NMR indicate the predominant formation of symmetrical product 3 in 80% yield. $^1$H NMR (400 MHz, Benzene-d$_6$) δ 6.92 (t, 2H), 6.70 (d, 2H), 6.63 (d, 2H), 6.33 (d, 2H), 5.76 (t, 11H), 2.89 (m, 4H), 2.85 (s, 6H), 2.37 (m, 2H), 1.94 (m, 2H), 1.07 (s, 6H), −0.21 (s, 6H). $^{19}$F NMR (400 MHz, THF-ds) 6-133.6 (m, 2F), −159.8 (m, 1F), −164.4 (m, 2F).

(1E,1'E)-1,1'-(pyridine-2,6-diyl)bis(N-(2,6-dimethyl-4-(4,4,5,5-tetramethyl-1,3,2-dioxaborolan-2-yl)phenyl)ethan-1-imine) (4). (1E,1'E)-1,1'-(pyridine-2,6-diyl)bis(N-(2,6-dimethyl-4-(4,4,5,5-tetramethyl-1,3,2-dioxaborolan-2-yl)phenyl)ethan-1-imine) was synthesized as shown in Scheme 6.

Scheme 6

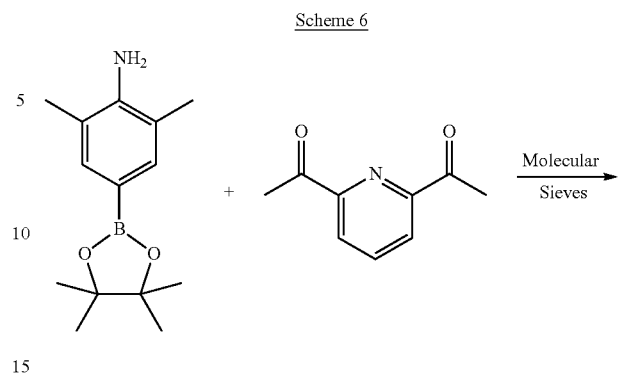

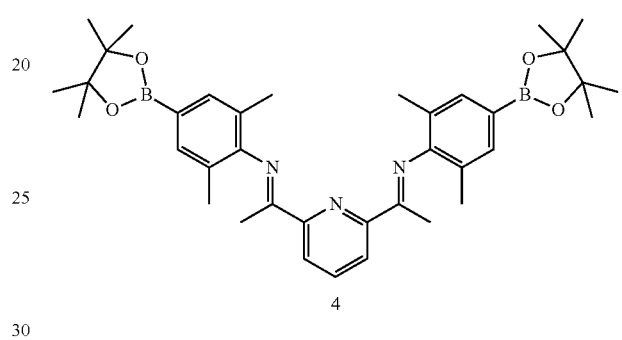

4

2,6-Dimethyl-4-(4,4,5,5-tetramethyl-1,3,2-dioxaborolan-2-yl)aniline was prepared as follows (see Organometallics 2019, 38, 2338-2346). 2,6-dimethyl-4-bromoaniline (9.30 g, 46.5 mmol, 1 equiv.), KOAc (13.69 g, 139.5 mmol, 3 equiv.), and bis(pinacolato)diboron (12.98 g, 47.6 mmol, 1.1 equiv.) were loaded in a 250 ml round bottom flask followed by the addition of dioxane (150 mL). The mixture was stirred for 5 minutes before adding PdCl2(dppf) (1.89 g, 2.3 mmol, 0.05 equiv.) and then the contents were stirred at 80° C. for 20 hours. The reaction was then allowed to cool down to room temperature. The crude reaction mixture was added to a separating funnel containing a benzene/water (75:25) (750 mL) solution. The organic layer was collected, dried over anhydrous MgSO$_4$, filtered and concentrated in vacuo. The crude product was purified using Biotage using 10% Ethyl acetate in hexanes as eluent to afford 5.9 g (52%) of the desired boronate as a white spongy solid. $^1$H NMR (400 MHz, CDCl3, ppm) S: 7.44, 4.89, 2.24, 1.34. 2,6-diacetyl pyridine (0.33 g, 0.002 mol), (1.0 g, 0.004 mol) of 2,6-dimethyl-4-(4,4,5,5-tetramethyl-1,3,2-dioxaborolan-2-yl) aniline and 200 mL of dry toluene with a few crystals of para-toluenesulfonic acid and 100 grams of 3 Å molecular sieves (Organometallics, v. 25(12), 2006, pg. 2983). The reaction mixture was allowed to stir at 110° C. with a condenser under nitrogen atmosphere. The reaction mixture was filtered and dried under vacuum. The concentrated solution of toluene was left at −35° C. for crystallization yielded pale yellow crystalline solid (0.976 g, 78%). $^1$H NMR (400 MHz, C6D6, ppm) δ: 8.49, 7.28, 7.07, 6.98, 2.16, 2.04, 1.20, 0.99, 0.45.

Iron complex of N(E),N(E)-(2,6-pyridinediyldiethylidyne)bis(2-(9-borabicyclo[3.3.1]nonane-9-propyl)-6-isopropyl-benzenamine) (5). Iron complex of N(E),N(E)-(2,6-pyridinediyldiethylidyne)bis(2-(9-borabicyclo[3.3.1]nonane-9-propyl)-6-isopropyl-benzenamine) was synthesized as shown in Scheme 7.

Scheme 7

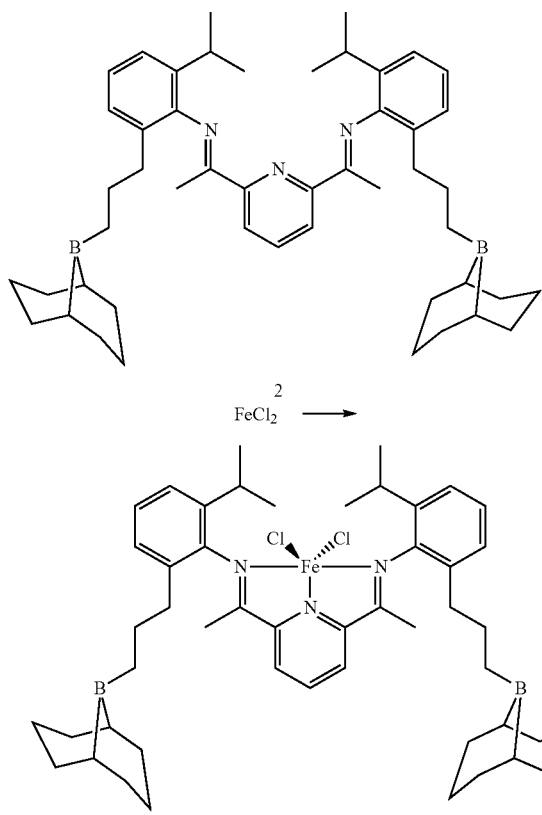

Scheme 8

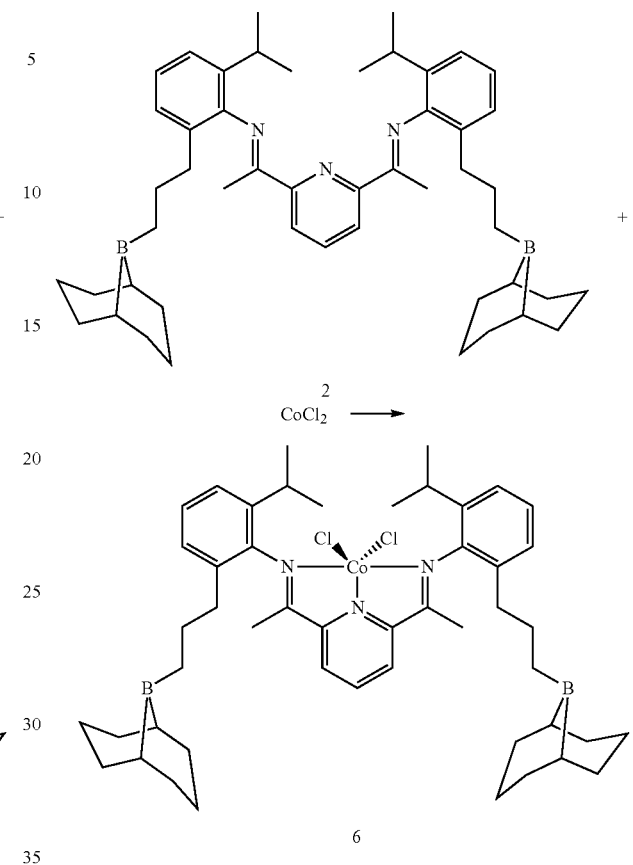

1.0 equivalent of anhydrous FeCl$_2$ was added to the stirred mixture of 1 equivalent of N(E),N(E)-(2,6-pyridinediyldiethylidyne)bis(2-(9-borabicyclo[3.3.1]nonane-9-propyl)-6-isopropyl-benzenamine) 2 in THF. The resulting mixture turned deep blue. The mixture was allowed to stir for 16 hours. After 16 hours, the solvent was removed in vacuo, and the residue was suspended in pentane and further stirred for 2 hours. The resulting precipitate was isolated, washed with pentane and dried in vacuo to afford the iron complex of N(E),N(E)-(2,6-pyridinediyldiethylidyne)bis(2-(9-borabicyclo[3.3.1]nonane-9-propyl)-6-isopropyl-benzenamine) as paramagnetic (high spin) blue powder in 87% yield. $^1$H NMR spectra show lack of fine splitting across the range of 85 to −40 ppm. $^1$H NMR (400 MHz, CD$_2$Cl$_2$) δ 81.60, 15.57, 14.85, 1.27, 0.89, −0.24, −0.80, −1.40, −2.44, −3.61, −4.45, −5.23, −6.18, −6.76, −8.91, −10.02, −11.15, −35.54, −36.36. X-ray crystallography: Space group=C 2/c; Unit cell: a=37.777(5), b=15.463(2), c=18.068(2); α=90° β=95.302(4)° γ=90°; V=10509.5 Å$^3$. The X-ray crystal structure of compound 5 is shown in FIG. 1.

Cobalt complex of N(E),N(E)-(2,6-pyridinediyldiethylidyne)bis(2-(9-borabicyclo[3.3.1]nonane-9-propyl-benzenamine) (6). Cobalt complex of N(E),N(E)-(2,6-pyridinediyldiethylidyne)bis(2-(9-borabicyclo[3.3.1]nonane-9-propyl)-6-isopropyl-benzenamine) was synthesized as shown in Scheme 8.

Figure 2:
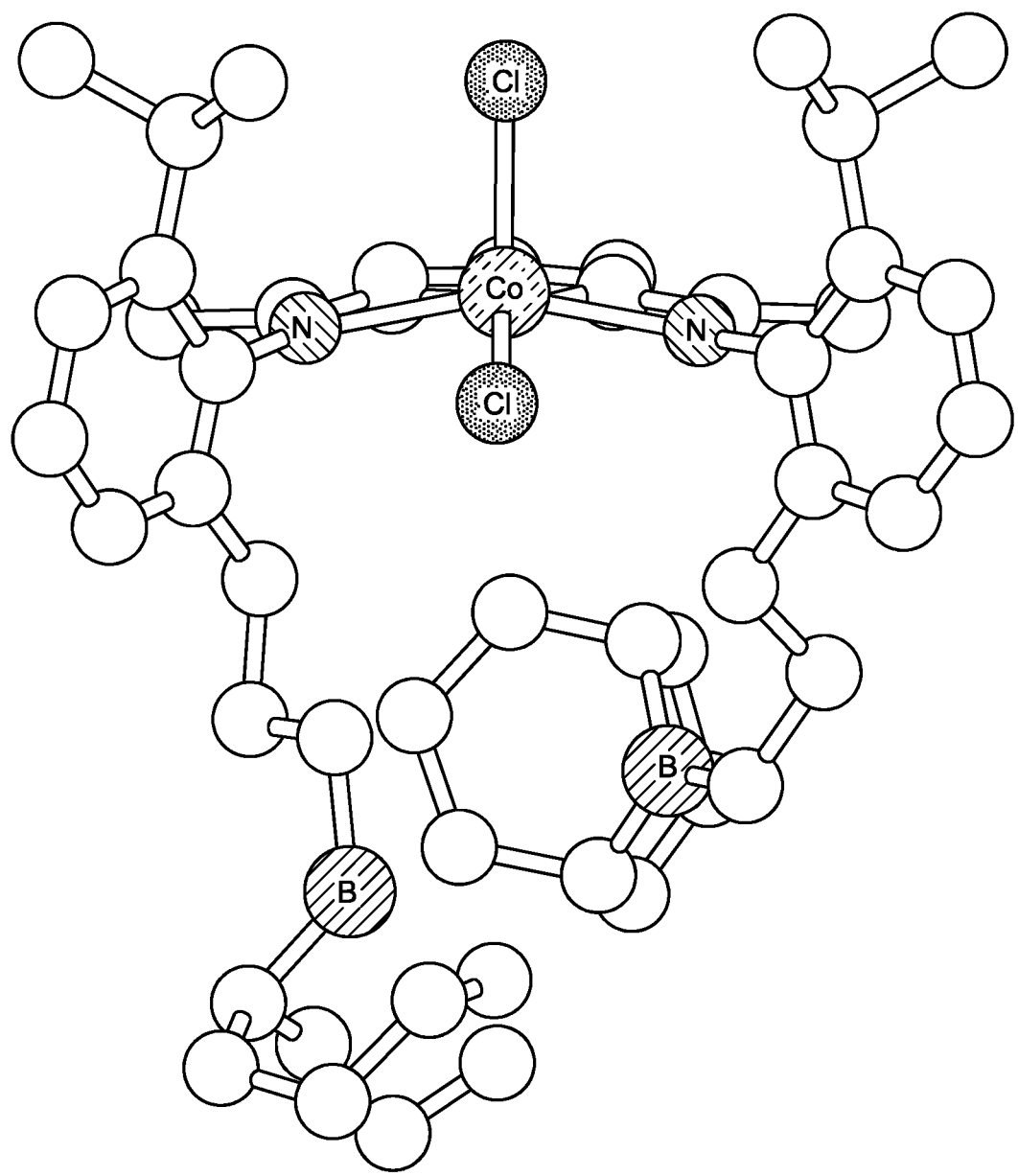
FIG. 2 is a representation of the crystalline structure of cobalt complex of N(E),N(E)-(2,6-pyridinediyldiethylidyne)bis(2-(9-borabicyclo[3.3.1]nonane-9-propyl)-6-isopropyl-benzenamine) (6).

1.0 equivalent of anhydrous CoCl$_2$ was added to the stirred mixture of 1 equivalent of N(E),N(E)-(2,6-pyridinediyldiethylidyne)bis(2-(9-borabicyclo[3.3.1]nonane-9-propyl)-6-isopropyl-benzenamine) 2 in THF. The resulting mixture turned tan/brown. The mixture was allowed to stir for 16 hours. After 16 hours, the solvent was removed in vacuo, and the residue was suspended in pentane and further stirred for 2 hours. The resulting precipitate was isolated, washed with pentane and dried in vacuo to afford the cobalt complex of N(E),N(E)-(2,6-pyridinediyldiethylidyne)bis(2-(9-borabicyclo[3.3.1]nonane-9-propyl)-6-isopropyl-benzenamine) as paramagnetic (high spin) tan powder in 57% yield. $^1$H NMR spectra show lack of fine splitting across the range of 85 to −40 ppm. $^1$H NMR (400 MHz, THF) δ 68.60, 68.37 (likely isomeric mixture), 54.65, 38.15, 35.36, 7.28, 6.92, 6.65, 5.74, −3.86, −9.75, −13.37, −17.54, −21.40. X-ray crystallography: Space group=C 2/c; Unit cell: a=37.96(5), b=15.46(2), c=18.05(3); α=90° β=95.77(2)° γ=90°; V=10545 Å$^3$. The X-ray crystal structure of compound 7 is shown in FIG. 2.

Iron complex of N(E),N(E)-(2,6-pyridinediyldiethylidyne)bis(2-(1,1-(bis(pentafluorophenyl)boryl)propyl)-6-isopropyl-benzenamine) (7). Iron complex of N(E),N(E)-(2,6-pyridinediyldiethylidyne)bis(2-(1,1-(bis(pentafluorophenyl)boryl)propyl)-6-isopropyl-benzenamine) was synthesized as shown in Scheme 9.

Scheme 9

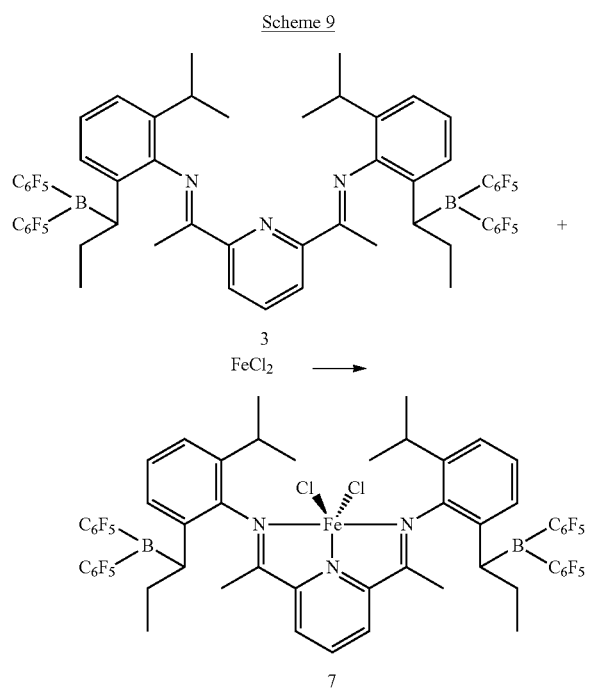

1.0 equivalent of anhydrous FeCl₂ was added to the stirred mixture of 1 equivalent of N(E),N(E)-(2,6-pyridinediyldiethylidyne)bis(2-(1,1-(bis(pentafluorophenyl)boryl)propyl)-6-isopropyl-benzenamine) 3 in THF. The resulting mixture turned deep blue. The mixture was allowed to stir for 16 hours. After 16 hours, the solvent was removed in vacuo, and the residue was suspended in pentane and further stirred for 2 hours. The resulting precipitate was isolated, washed with pentane and dried in vacuo to afford the Iron complex of N(E),N(E)-(2,6-pyridinediyldiethylidyne)bis(2-(1,1-(bis(pentafluorophenyl)boryl)propyl)-6-isopropyl-benzenamine) as paramagnetic (high spin) blue powder in 90% yield. $^1$H NMR spectra show lack of fine splitting across the range of 85 to −40 ppm. $^1$H NMR (400 MHz, THF) δ 82.15, 17.16, 14.74, 14.52, 10.97, 8.57, 7.16, −3.47, −6.72, −8.86, −11.09, −12.39, −38.55.

Iron complex of (1E,1'E)-1,1'-(pyridine-2,6-diyl)bis(N-(2,6-dimethyl-4-(4,4,5,5-tetramethyl-1,3,2-dioxaborolan-2-yl)phenyl)ethan-1-imine) (8) was synthesized according to Scheme 10.

Scheme 10

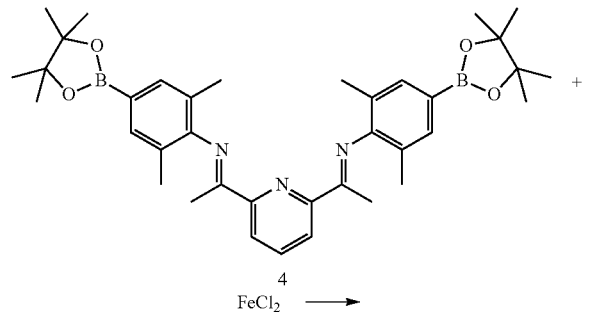

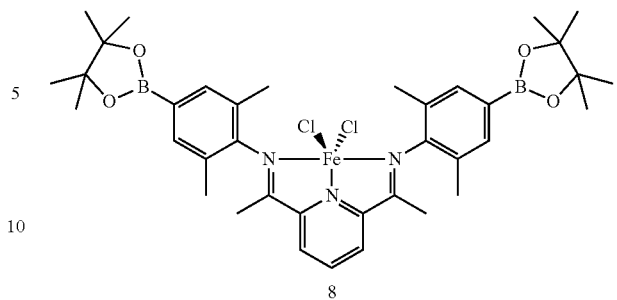

PDI ((1E,1'E)-1,1'-(pyridine-2,6-diyl)bis(N-(2,6-dimethyl-4-(4,4,5,5-tetramethyl-1,3,2-dioxaborolan-2-yl)phenyl)ethan-1-imine) ligand (6.290 g, 0.01 mol) was dissolved in THF (100 ml) and FeCl₂ (1.283 g, 0.01 mol) was added to the solution of ligand in one portion (B. Small, Acc. Chem. Res. 2015, v. 48, pg. 2599). The reaction mixture was allowed to stir at room temperature for 72 hours at ambient temperature under the atmosphere of N₂. The reaction mixture turned to dark blue instantly. The solvent from the reaction mixture was dried under vacuum resulting in a dark blue precipitate. The crude material was again dissolved in 50 ml of DCM and allowed to stir overnight to extract maximum amount of product. The dark blue crude solution was passed thought a glass filter to remove insoluble impurities. Excess DCM was removed under vacuum. The product was washed with 3×50 ml of hexane, in which the product was insoluble and it helps to remove any starting material from the complex. The intensively dark solid was dried again under vacuum to remove residual solvent yielding 3.13 g (41.3%) of blue solid. $^1$H NMR (400 MHz, CD₂Cl₂, ppm) δ: 3.73, 1.86, 1.45, 1.29.

Syntheses of Asymmetrical Imino Pyridine Compounds and their Transition Metal-Complexes N(E)-1-(6-(1-((2,6-diisopropylphenyl)imino)ethyl)pyridin-2-yl)ethan-1-oxy-4,4,5,5-tetramethyl-1,3,2-dioxaboronate (9). N(E)-1-(6-(1-((2,6-diisopropylphenyl)imino)ethyl)pyridin-2-yl)ethan-1-oxy-4,4,5,5-tetramethyl-1,3,2-dioxaboronate was synthesized as shown in Scheme 11.

Scheme 11

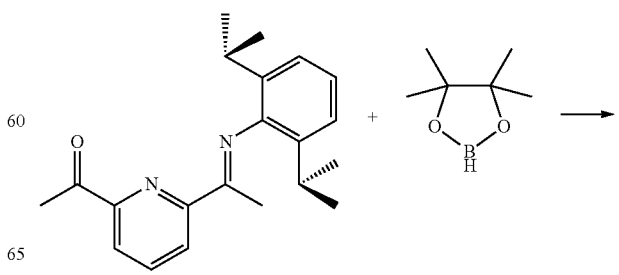

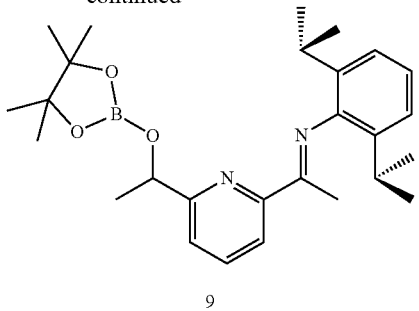

9

A small vial was charged with, in the following order, 8 mL of toluene, NaOtBu (5 mol %), (E)-1-(6-(1-((2,6-diisopropylphenyl)imino)ethyl)pyridin-2-yl)ethan-1-one, and 4,4,5,5-tetramethyl-1,3,2-dioxaborolane (pinacolborane). Upon addition of pinacolborane, the mixture slightly changed color to pale yellow. The solution was stirred for desired amount of time (3 hours-24 hours) after which solvent removal afforded the pure N(E)-1-(6-(1-((2,6-diisopropylphenyl)imino)ethyl)pyridin-2-yl)ethan-1-oxy-4,4,5,5-tetramethyl-1,3,2-dioxaboronate compound 7 which was briefly washed with pentane (off-white powder, 85% yield). $^1$H NMR (400 MHz, Benzene-d$_6$) δ 8.37 (d, 1H), 7.54 (d, 1H), 7.24 (t, 1H), 7.18 (m, 3H), 5.71 (m, 1H), 2.85 (m, 2H), 2.25 (s, 3H), 1.67 (d, 3H), 1.17 (m, 6H), 1.11 (m, 6H), 1.02 (d, 12H).

N(E)-9-(1-(6-(1-((2,6-diisopropylphenyl)imino)ethyl)pyridin-2-yl)ethan-1-oxy)-9-borabicyclo[3.3.1]nonane (10). N(E)-9-(1-(6-(1-((2,6-diisopropylphenyl)imino)ethyl)pyridin-2-yl)ethan-1-oxy)-9-borabicyclo[3.3.1]nonane was synthesized as shown in Scheme 12.

Scheme 12

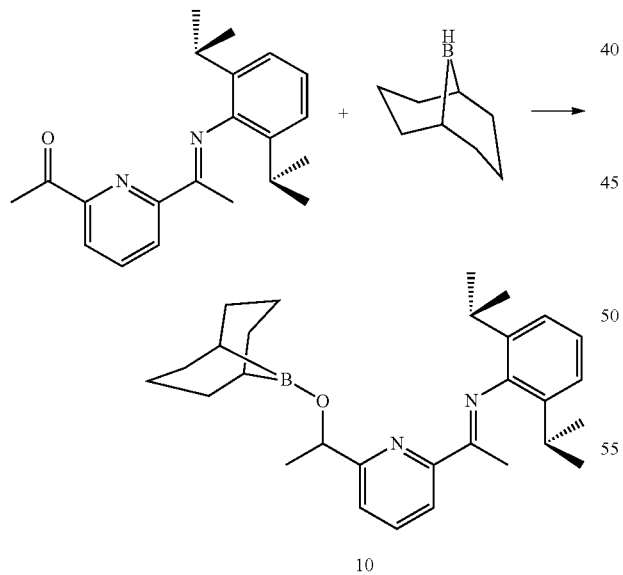

10

A small vial was charged with, in the following order, 8 mL of toluene, NaOtBu (5 mol %), (E)-1-(6-(1-((2,6-diisopropylphenyl)imino)ethyl)pyridin-2-yl)ethan-1-one, and 9-borabicyclo[3.3.1]nonane. Upon addition of 9-borabicyclo[3.3.1]nonane, the mixture slightly changed color to pale yellow. The solution was stirred for desired amount of time (3 hours-24 hours) after which the pure N(E)-9-(1-(6-(1-((2,6-diisopropylphenyl)imino)ethyl)pyridin-2-yl)ethan-1-oxy)-9-borabicyclo[3.3.1]nonane compound 10 was obtained by recrystallization from pentane. The product was briefly washed with pentane (white powder, 67% yield). $^1$H NMR (400 MHz, Benzene-d) δ 8.47 (d, 1H), 7.59 (d, 1H), 7.36 (t, 1H), 7.27 (m, 3H), 5.65 (m, 1H), 2.98 (m, 2H), 2.39 (s, 3H), 1.92 (m, 10H), 1.71 (d, 3H), 1.56 (m, 2H), 1.27 (m, 6H), 1.19 (m, 6H).

N(E)-1-(6-(1-((2,6-diisopropylphenyl)imino)ethyl)pyridin-2-yl)ethan-1-oxy-(bis(pentafluorophenyl)borane) (11). N(E)-1-(6-(1-((2,6-diisopropylphenyl)imino)ethyl)pyridin-2-yl)ethan-1-oxy-(bis(pentafluorophenyl)borane) was synthesized as shown in Scheme 13.

Scheme 13

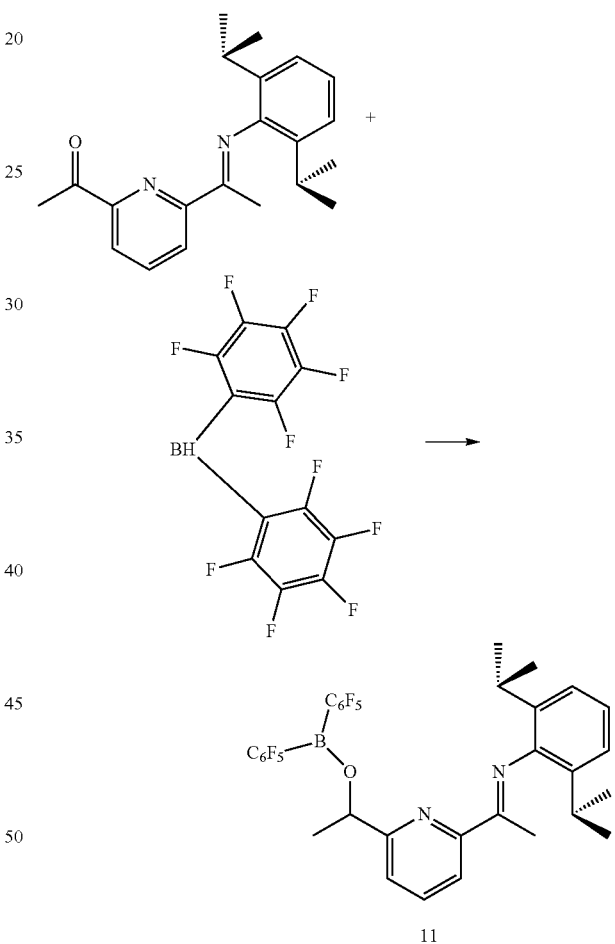

11

A small vial was charged with, in the following order, 8 mL of toluene, NaOtBu (5 mol %), (E)-1-(6-(1-((2,6-diisopropylphenyl)imino)ethyl)pyridin-2-yl)ethan-1-one, and HB(C$_6$F$_5$)$_2$. Upon addition of HB(C$_6$F$_5$)$_2$, the mixture slightly changed color to pale yellow. The solution was stirred for desired amount of time (3 hours-24 hours) after which solvent removal afforded the pure N(E)-1-(6-(1-((2,6-diisopropylphenyl)imino)ethyl)pyridin-2-yl)ethan-1-oxy-(bis(pentafluorophenyl)borane) compound 11 which was briefly washed with pentane (white powder, 74% yield): $^1$H NMR (400 MHz, Benzene-d$_6$) δ 7.77 (d, 1H), 7.09 (m, 3H), 6.98 (t, 1H), 6.43 (d, 1H), 4.69 (m, 1H), 2.44 (m, 1H), 1.97 (s, 3H), 1.77 (m, 1H), 1.37 (d, 3H), 1.20 (m, 6H), 1.09 (m, 6H).

Iron complex of N(E)-1-(6-(1-((2,6-diisopropylphenyl)imino)ethyl)pyridin-2-yl)ethan-1-oxy-4,4,5,5-tetramethyl-1,3,2-dioxaboronate (12). Iron complex of N(E)-1-(6-(1-((2,6-diisopropylphenyl)imino)ethyl)pyridin-2-yl)ethan-1-oxy-4,4,5,5-tetramethyl-1,3,2-dioxaboronate was synthesized as shown in Scheme 14.

Scheme 14

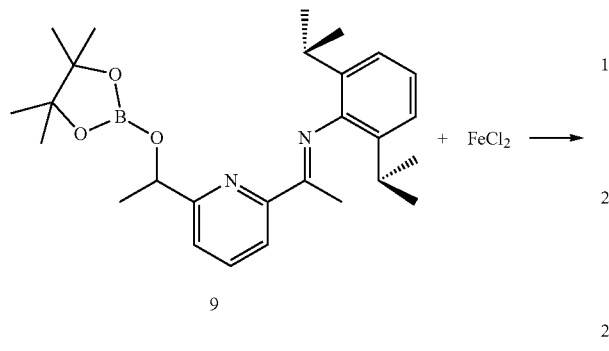

9

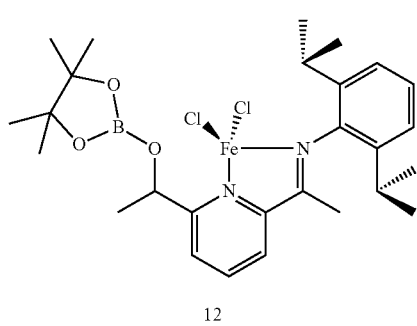

12

Figure 3:
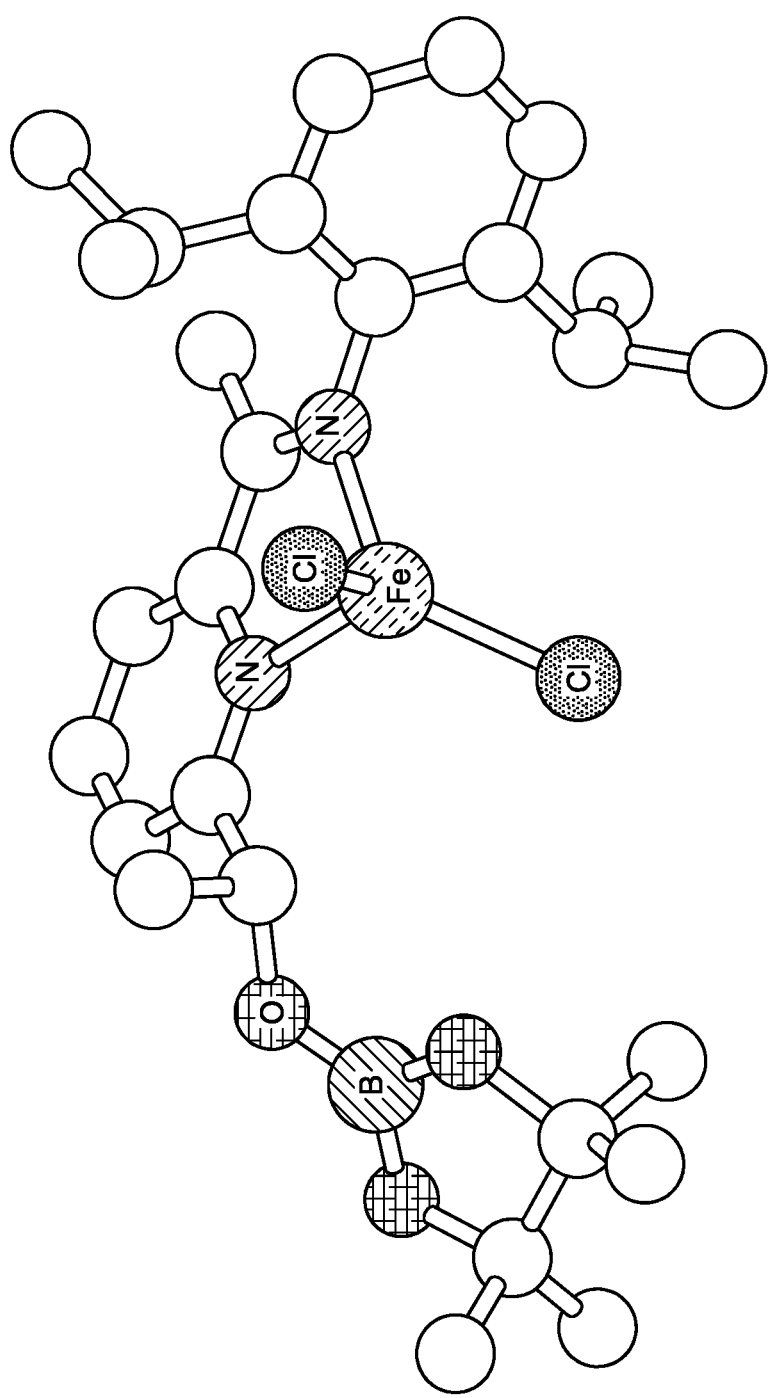
FIG. 3 is a representation of the crystalline structure of iron complex of N(E)-1-(6-(1-((2,6-diisopropylphenyl)imino)ethyl)pyridin-2-yl)ethan-1-oxy-4,4,5,5-tetramethyl-1,3,2-dioxaboronate (12).

N(E)-1-(6-(1-((2,6-diisopropylphenyl)imino)ethyl)pyridin-2-yl)ethan-1-oxy-4,4,5,5-tetramethyl-1,3,2-dioxaboronate 9 was dissolved in dichloromethane/THF mixture. While stirring, solid FeCl₂ was added. The reaction mixture slowly began to turn light green, and progressively, turned purple. The mixture was stirred overnight. After 16 hours, the reaction mixture was concentrated to ca 1 mL and excess pentane was added to precipitate the product. The obtained solid was washed with pentane (2×10 mL) and dried in vacuo. The iron complex was obtained as pink paramagnetic powder in an 84% yield. $^1$H NMR (400 MHz, CD$_2$Cl$_2$) δ 97.46, 64.92, 55.91, 4.23, 4.23, 2.89, 2.16, 1.26, 0.87, −0.60, −0.92, −3.92, −5.73, −6.29, −15.91, −18.22, −24.30. $^{11}$B NMR (128 MHz, CD$_2$Cl$_2$) δ 8.19. X-ray crystallography: Space group=P −1; Unit cell: a=9.6692(6), b=12.8658(6), c=14.8445(6); α=114.995(2)° β=101.253(2)° γ=94.902(2°) V=1612.01 Å$^3$. The X-ray crystal structure of compound 10 is shown in FIG. 3.

Iron complex of N(E)-9-(1-(6-(1-((2,6-diisopropylphenyl)imino)ethyl)pyridin-2-yl)ethan-1-oxy)-9-borabicyclo[3.3.1]nonane (13). Iron complex of N(E)-9-(1-(6-(1-((2,6-diisopropylphenyl)imino)ethyl)pyridin-2-yl)ethan-1-oxy)-9-borabicyclo[3.3.1]nonane was synthesized as shown in Scheme 15.

Scheme 15

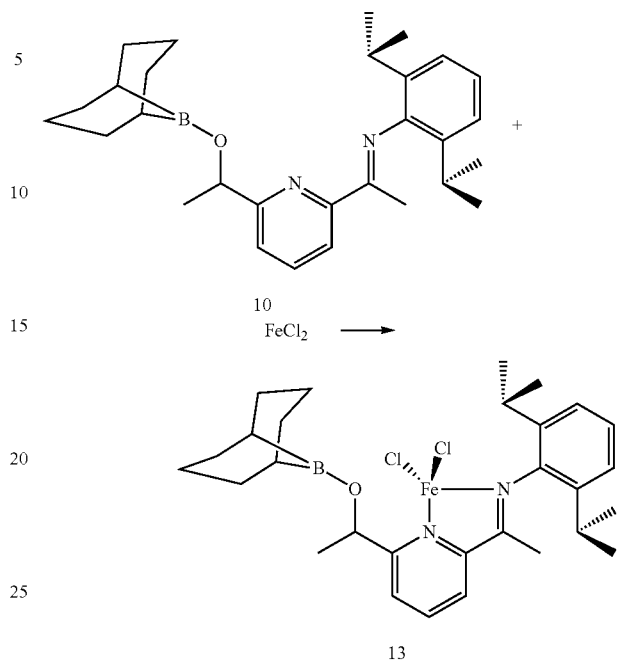

Figure 4:
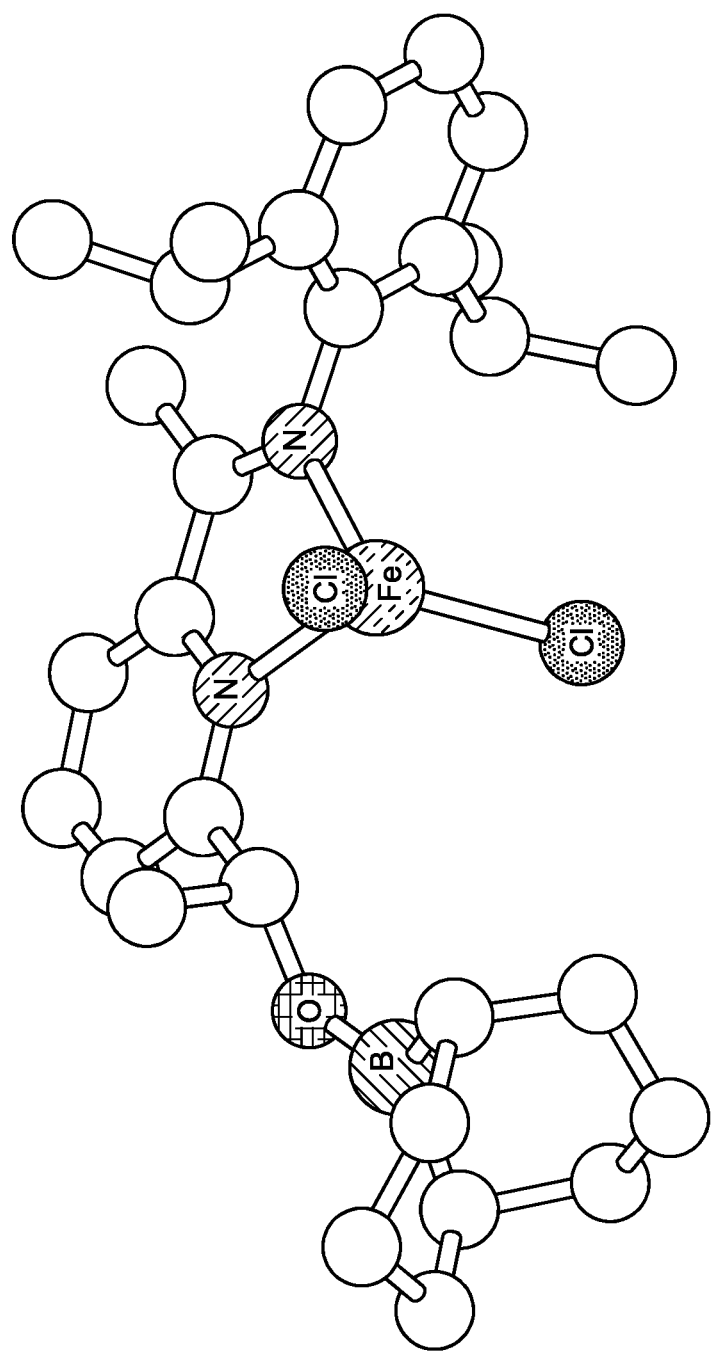
FIG. 4 is a representation of the crystalline structure of iron complex of N(E)-9-(1-(6-(1-((2,6-diisopropylphenyl)imino)ethyl)pyridin-2-yl)ethan-1-oxy)-9-borabicyclo[3.3.1] nonane (13).

N(E)-9-(1-(6-(1-((2,6-diisopropylphenyl)imino)ethyl)pyridin-2-yl)ethan-1-oxy)-9-borabicyclo[3.3.1]nonane 10 was dissolved in dichloromethane/THF mixture. While stirring, solid FeCl₂ was added. The reaction mixture slowly began to turn light green, and progressively, turned purple. The mixture was stirred overnight. After 16 hours, the reaction mixture was concentrated to ca 1 mL and excess pentane was added to precipitate the product. The obtained solid was washed with pentane (2×10 mL) and dried in vacuo. The iron complex was obtained as purple paramagnetic powder in an 88% yield. $^1$H NMR (400 MHz, CD$_2$Cl$_2$) δ 93.29, 61.05, 53.17, 2.64, 1.14, 0.55, 0.33, −0.57, −0.95, −1.77, −2.08, −3.64, −5.99, −18.10, −19.42, −24.03 X-ray crystallography: Space group=P 2₁/c; Unit cell: a=14.511(1), b=13.438(1), c=16.4153(11); α=90° β=114.860(2)° γ=90° V=2904.52 Å$^3$. The X-ray crystal structure of compound 13 is shown in FIG. 4.

Iron complex of N(E)-1-(6-(1-((2,6-diisopropylphenyl)imino)ethyl)pyridin-2-yl)ethan-1-oxy-(bis(pentafluorophenyl)borane) (14). (E)-1-(6-(1-((2,6-diisopropylphenyl)imino)ethyl)pyridin-2-yl)ethan-1-oxy-(bis(pentafluorophenyl)borane) was synthesized as shown in Scheme 16.

Scheme 16

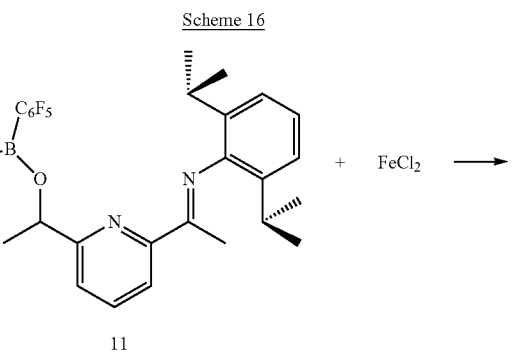

11

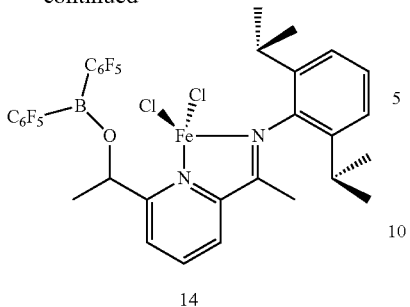

14

Figure 5:
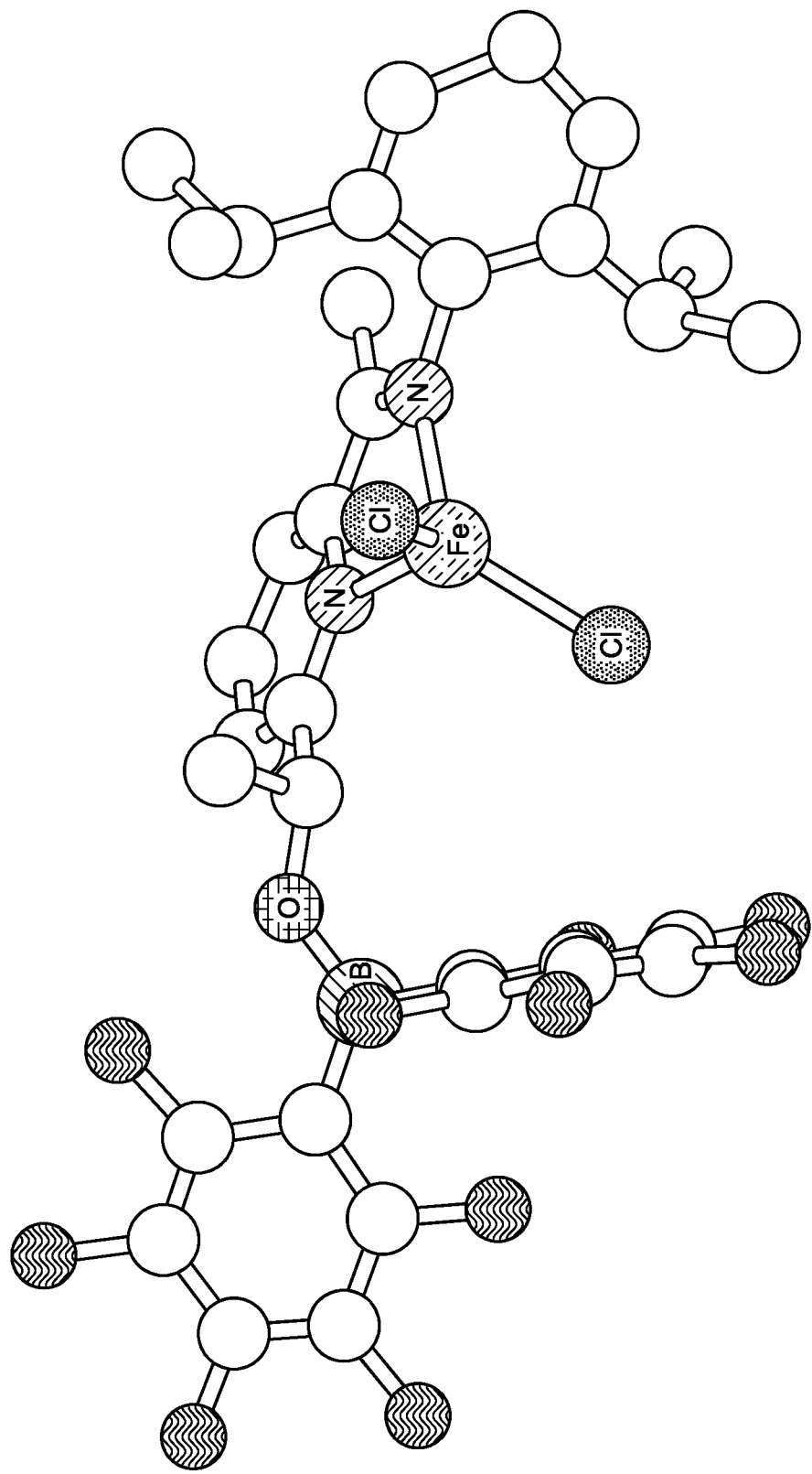
FIG. 5 is a representation of the crystalline structure of iron complex of N(E)-1-(6-(1-((2,6-diisopropylphenyl)imino)ethyl)pyridin-2-yl)ethan-1-oxy-(bis(pentafluorophenyl)borane) (14).

N(E)-1-(6-(1-((2,6-diisopropylphenyl)imino)ethyl)pyridin-2-yl)ethan-1-oxy-(bis(pentafluorophenyl)borane) 11 was dissolved in dichloromethane/THF mixture. While stirring, solid FeCl$_2$ was added. The reaction mixture slowly began to turn light green, and progressively, turned purple. The mixture was stirred overnight. After 16 hours, the reaction mixture was concentrated to ca 1 mL and excess pentane was added to precipitate the product. The obtained solid was washed with pentane (2×10 mL) and dried in vacuo. The iron complex was obtained as red paramagnetic powder in an 86% yield. $^1$H NMR (400 MHz, CD$_2$Cl$_2$) δ 96.41, 61.72, 55.70, 5.33, 2.58, 0.91, 0.88, 0.68, 0.14, −0.59, −0.82, −0.97, −3.90, −5.33, −16.79, −19.58, −26.05. X-ray crystallography: Space group=P −1; Unit cell: a=14.520(13), b=14.848 (14), c=19.339(18); α=107.301(9)° β=102.472(9)° γ=101.594(8)° V=3726.12 Å$^3$. The X-ray crystal structure of compound 14 is shown in FIG. 5.

Supported Catalyst Preparation

Catalyst was supported by ES70 silica and two procedures were handled to support OMC 5166 to resolve the problem of solubility.

Procedure 1 (supported catalyst S1): Silica (750 mg) was loaded in the celestir followed by the addition of 50 ml of toluene. The mixture was stirred for few seconds to achieve homogeneity. MAO (1 g) was added through the side arm slowly over 5 minutes with constant stirring. The mixture was allowed to stir for an hour at room temperature under N$_2$. Catalyst, 8 (0.029 g, 40 µmol) was added to the SMAO and allowed to stir for another 3 hours at room temperature. The slurry was filtered through glass frit and washed with toluene (30 ml) and followed by pentane (20 ml). Then the supported catalyst was then dried under vacuum for 3 hours yields dirty white free flowing solid of approximately 1 g.

Procedure 2 (supported catalyst S2): MAO (750 mg) was loaded in the celestir followed by the addition of 50 ml of toluene. Catalyst, 8 (0.029 g, 40 µmol) was added to the above solution. The mixture was allowed to stir for an hour at room temperature under N$_2$. Silica (750 mg) was added to the reaction mixture and allowed to stir for another 3 hours at room temperature. The slurry was filtered through glass frit and washed with toluene (30 ml) and followed by pentane (20 ml). Then the supported catalyst was then dried under vacuum for 3 hours yields dirty white free flowing solid of approximately 1 g.

Polymerization Reactions. Polymerization of ethylene with variable amounts of 1-hexene was carried out for bis-imino and imino pyridine catalysts with Lewis acid functionalities 5-8 and 12-14 as well as bis-imino and imino pyridine catalysts C$_1$-C$_4$, shown in Scheme 17, that do not include Lewis acid functional moieties.

Scheme 17

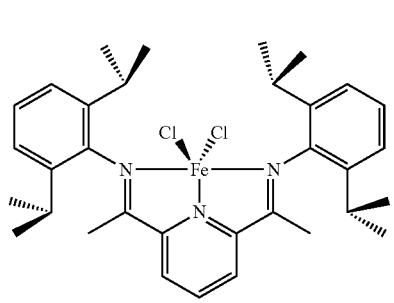

C1

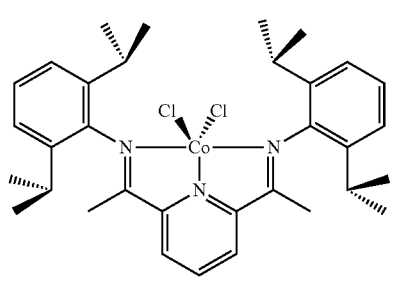

C2

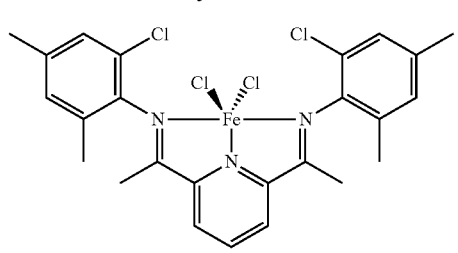

C3

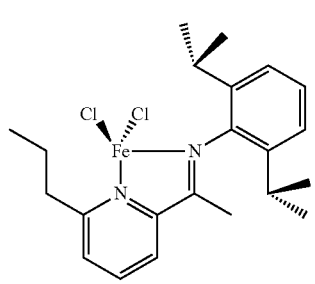

C4

Polymerization data is summarized in Table 1 below.

TABLE 1

| Runs | Catalyst | C$_2$ (psi) | Yield (mg) | Activity (kg PE/ mmol Fe * h) | Mw (kg/mol) | PDI (Mw/Mn) | Tm (° C.) |
|---|---|---|---|---|---|---|---|
| 1 | 5 | 120 | 88.5 | 597.8 | 74 | 2.4 | 133 |
| 2 | 5 | 150 | 116.2 | 1076.5 | 52 | 2.4 | 134 |
| 3 | 6 | 120 | 41.2 | 38.9 | 20 | 2.2 | 129 |
| 4 | 7 | 150 | 102 | 735.6 | 114 | 3.2 | 135 |
| 5 | 8 | 120 | 118.2 | 1641.8 | 30 | 2.0 | 131 |
| 6 | 12 | 150 | 37.8 | 36.6 | 84 | 3.0 | 135 |
| 7 | 13 | 150 | 34.2 | 26.1 | 81 | 3.0 | 134 |
| 8 | 14 | 150 | 35 | 16.9 | 94 | 2.3 | 135 |
| 9 | C1 | 120 | 34.3 | 24.5 | 99 | 1.9 | 132 |
| 10 | C2 | 120 | 26.3 | 2.1 | 90 | 5.4 | 132 |
| 11 | C3 | 150 | 72 | 181.3 | 25 | 2.1 | 132 |
| 12 | C4 | 120 | 33.6 | 2.6 | 896 | 9.2 | 135 |

Figure 6:
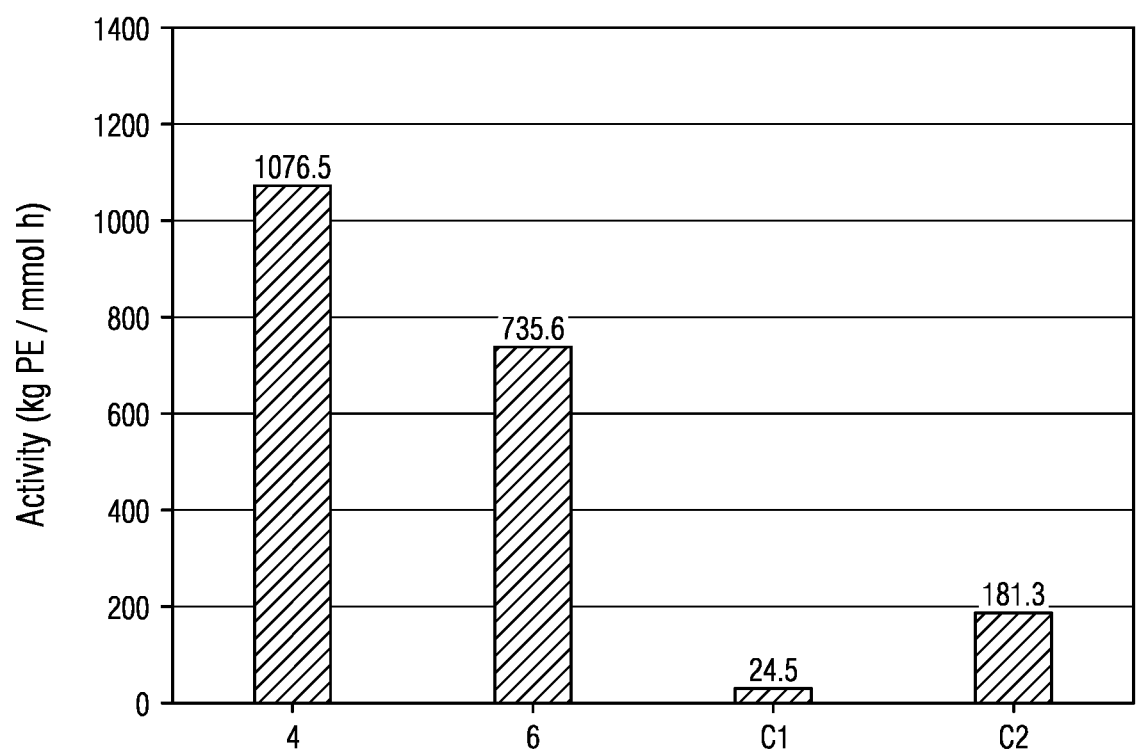
FIG. 6 shows a graph comparatively illustrating the activities of the transition metal-complex catalysts having pendant group 13 Lewis acid moieties (5) and (7) and the activities of transition metal-complex catalysts without said pendant moieties ($C_1$) and ($C_3$) of the present disclosure.

As indicated in the table, bis-imino pyridine catalysts with Lewis acid functionalities 5-8 (Runs 1-4) had much higher activities relative to the catalysts C1-C4 that do not bear that functionality (Runs 9-12). For example, under identical conditions, catalyst 5(Run 1) had an activity of almost 25-fold that of commonly used catalyst C1 (Run 9) at the expense of slightly lower polymer MW (74 vs 99 kDa). In addition, a similar performance is observed for the cobalt catalyst 6 (Run 3), where the observed activity was almost 18-fold that of catalyst C2 (Run 10). Under slightly higher pressures (150 psi), catalysts 5 (Run 2) and 7 (Run 4) respectively showed 6- and 4-fold improvements in activity relative to highly active catalyst C3 (Run 11). In addition, both catalysts 5 and 7 appear to have better $M_w$ capability under those conditions. The presence of a pendant Lewis acid functionality results therefore in a drastic polymerization rate enhancement. This is best visualized in FIG. 6.

Figure 7A:
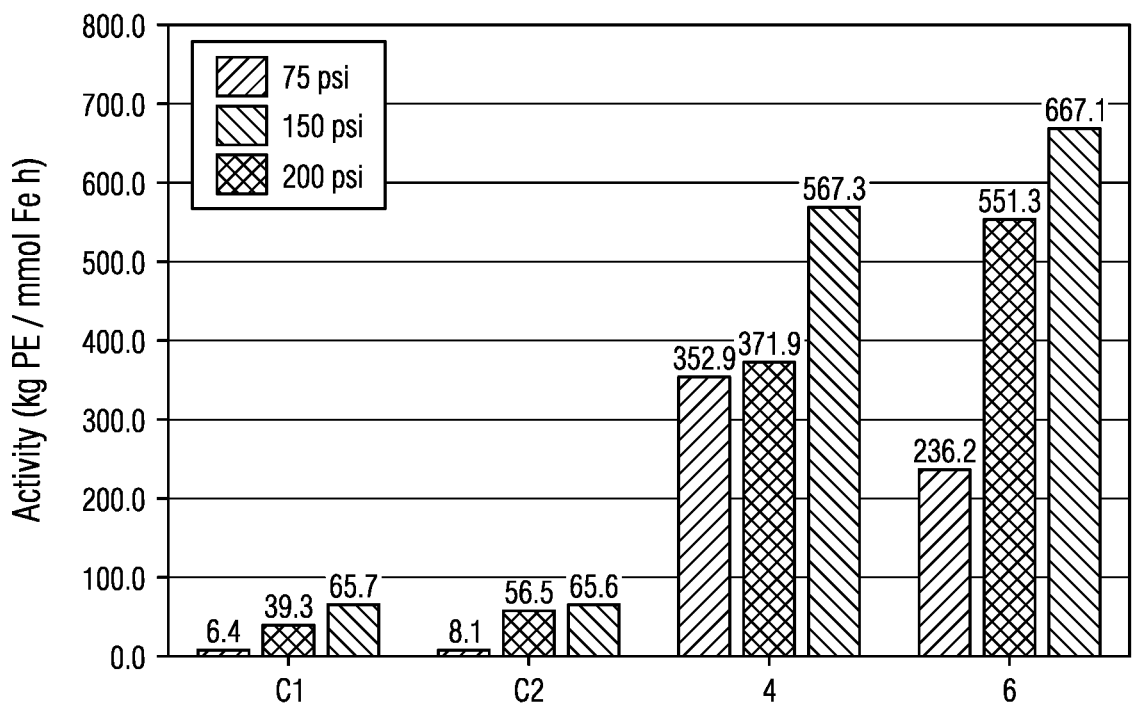
FIG. 7A shows a graph comparatively illustrating the activities of the transition metal-complex catalysts having pendant group 13 Lewis acid moieties (5) and (7) and the activities of transition metal-complex catalysts without said pendant moieties ($C_1$) and ($C_3$) of the present disclosure at different ethylene pressures.
Figure 7B:
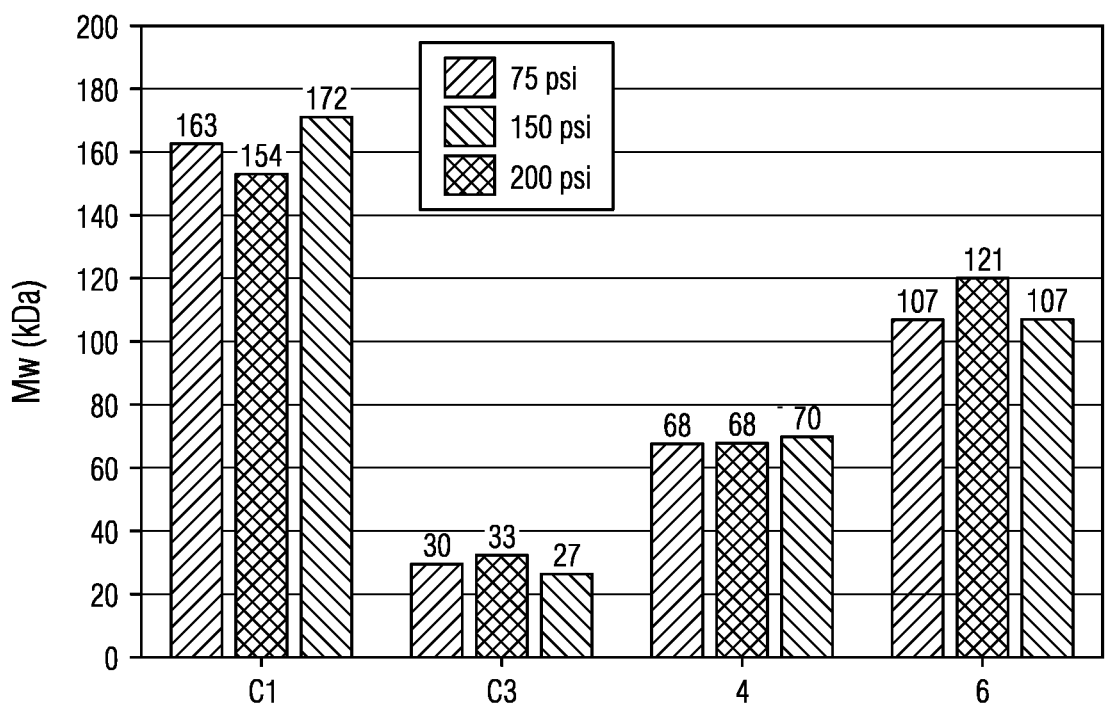
FIG. 7B shows a graph comparatively illustrating the polymer molecular weights of the transition metal-complex catalysts having pendant group 13 Lewis acid moieties (5) and (7) and the polymer molecular weights of transition metal-complex catalysts without said pendant moieties ($C_1$) and ($C_3$) of the present disclosure at different ethylene pressures.

FIG. 7 shows the comparison of activities and polymer molecular weights on ethylene pressure. Catalysts 5 and 7 had higher activities compared to catalysts C1 and C3. In all cases, catalyst activity increased with ethylene pressure, while molecular weights remained relatively constant for all catalysts.

Figure 8:
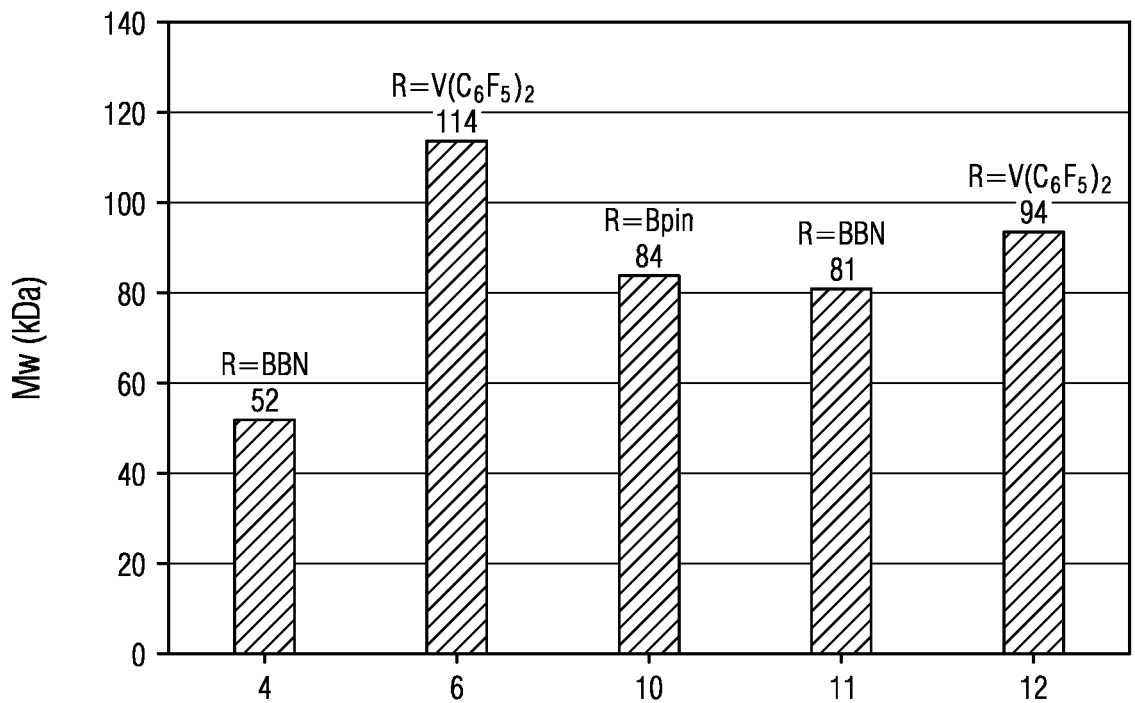
FIG. 8 shows a graph illustrating the polymer molecular weights obtained using transition metal-complex catalysts having pendant group 13 Lewis acid moieties (5), (7), (12), (13), and (14) of the present disclosure.

Regarding the imino pyridine catalyst family with Lewis acid functionalities (compounds 12-14), catalyst activities of ca 17-37 kg PE mmol Fe h were obtained. These activities were much improved compared to C4 which showed very low activity and broad MWD uncharacteristic of single site catalysts. Furthermore, catalysts 12-14 all had much narrower MWD relative to C4 and polymer molecular weights in the range of 80-90 kDa. In general, the nature of the Lewis acidic functionality does appear to have impact on polymer Mw: in both bis-imino pyridine and imino pyridine types of catalysts, $B(C_6F_5)_2$ moiety gave highest $M_w$ polymer. This effect is depicted in FIG. 8. As shown, while the activity of imino pyridine catalysts is much lower compared to bis-imino pyridine catalysts, the rate enhancement for complexes with pendant Lewis acids is evident for both families relative to unsubstituted analogs.

Figure 9:
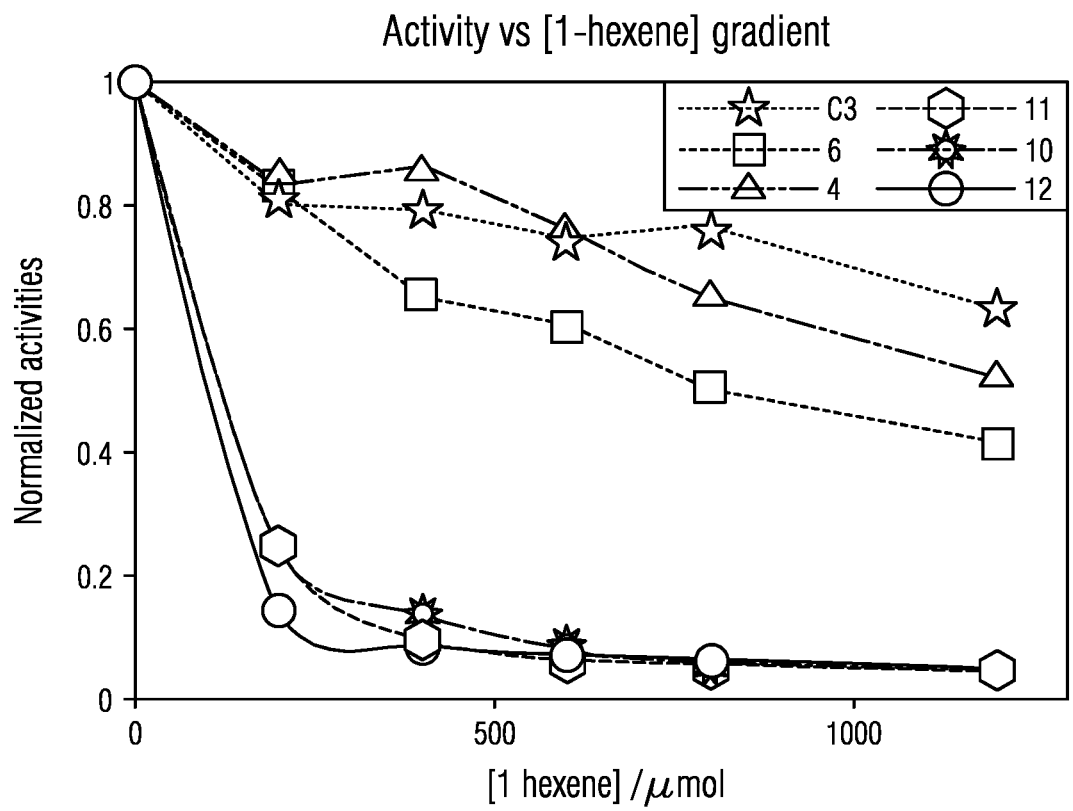
FIG. 9 shows a graph illustrating the catalyst deactivation in the presence of 1-hexene of transition metal-complex catalysts (5), (7), (12), (13), (14), and ($C_3$) of the present disclosure.

Ethylene-Alpha-olefin Copolymerization Testing. All complexes described in this document were evaluated for ethylene-hexene (EH) capability. In all cases, no incorporation of 1-hexene was detected. However, catalyst deactivation does seem to occur especially if 1-hexene loading becomes large. The deactivation profiles are shown below in FIG. 9. As shown, bis-imino pyridine complexes do not experience severe deactivation in the presence of 1-hexene. On the contrary, the related imino pyridine complexes 12-14 are deactivated even at lower concentration of 1-hexene. The plot also demonstrates that bis-imino pyridine catalysts with pendant Lewis acids 5 and 7 are tolerant of 1-hexene. In addition, compound 5 has similar deactivation profile as C3 (explored in mixed catalyst systems for bimodal HDPE production).

Supported catalyst testing. The supported catalyst based on catalyst 8 was tested in the salt bed reactor. The data for supported catalyst S1 and S2 are displayed below.

Results presented in the table indicate that catalysts S1 and S2 maintain good activity on silica support and produce products that have high molecular weights and low $C_6$ content.

What is claimed is:
1. A composition comprising:
a transition metal-complex having a structure of Formula (1), Formula (2), or Formula (3):

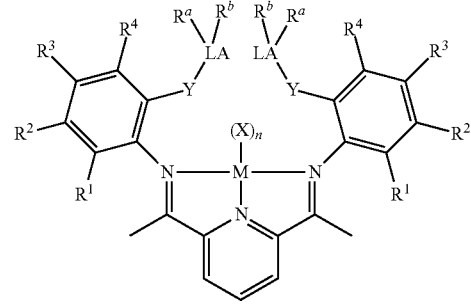

Formula (1)

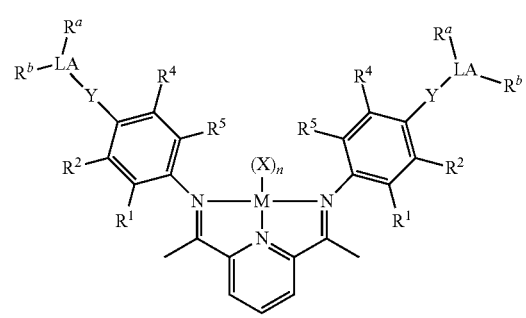

Formula (2)

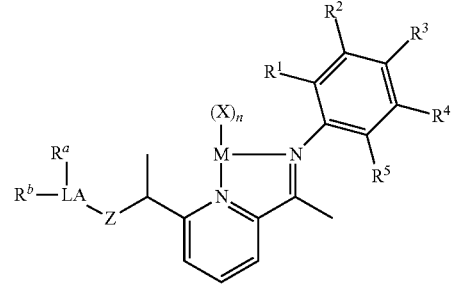

Formula (3)

wherein:
M is a group 6-10 transition metal;
X is a monovalent anionic ligand;
n is 2 or 3;

| Supported catalyst | H₂/C₂ feed ratio | Final H₂/C₂ feed ratio | C₆ (mL) | C₆/C₂ ratio | Catalyst (g) | Yield (g) | A (g/g · h) | C₆ (wt %) in product | $M_w$ (kDa) | PDI |
|---|---|---|---|---|---|---|---|---|---|---|
| S1 | 0.5 | 1814 | 2.5 | 0.1 | 0.0115 | 25.6 | 1280 | 0.26 | 360 | 22.2 |
| S2 | 0.5 | 1821 | 2.5 | 0.1 | 0.0224 | 57.3 | 1904 | 1.27 | 371 | 18.5 |
| C1 | 0.5 | 625 | 2.5 | 0.1 | 0.0205 | 8.8 | 429 | | | |
| C3 | 0.5 | 2947 | 2.5 | 0.1 | 0.0225 | 84.5 | 3756 | | | |

$R^1$, $R^2$, $R^3$, $R^4$, and $R^5$ are independently hydrogen or alkyl groups, where the alkyl groups have 1 to 10 carbons;

Y is $(CR'R'')_m$ where R' and R'' are independently hydrogen or $C_1$-$C_{10}$, optionally substituted, alkyl groups and m is an integer ranging from 0 to 10;

Z is an oxygen;

LA is a group 13 Lewis acid; and $R^a$ and $R^b$ are independently hydrocarbyl, substituted hydrocarbyl, halocarbyl, substituted halocarbyl, aryl, substituted aryl, heteroaryl, substituted heteroaryl, alkoxy, substituted alkoxy, or both $R^a$ and $R^b$ are hydrocarbyl, substituted hydrocarbyl, alkoxy, or substituted alkoxy groups joined and bound to the group 13 Lewis acid to form a ring structure comprising a cyclic group, a spirocyclic group, a bicyclic group, a fused bicyclic group, or a bridged bicyclic group.

2. The composition of claim 1, wherein LA is boron.

3. The composition of claim 2, wherein the $LA(R^a)(R^b)$ moiety is selected from the group consisting of bis(norbornyl)borane, pinacolborane, and $B(C_6F_5)_2$.

4. The composition of claim 1, wherein M is selected from the group consisting of Fe, Co, Cr, Mn, and Ni.

5. The composition of claim 1, wherein X is a halogen atom.

6. The composition of claim 5, wherein X is a chlorine atom.

7. The composition of claim 1, wherein $R^2$, $R^3$, and $R^4$ are hydrogen.

8. The composition of claim 1, wherein $R^1$ and $R^5$ are isopropyl groups.

9. The composition of claim 1, wherein Y is a propyl group.

10. The composition of claim 1, wherein M is Fe.

11. A catalyst system comprising:
at least one activator; and
the composition of claim 1.

12. A method comprising:
contacting the catalyst system of claim 11 with at least one olefin under polymerization reaction conditions; and
obtaining a polyolefin.

13. The method of claim 12, wherein the at least one olefin comprises ethylene.

14. The method of claim 12, wherein the polyolefin has an Mw of about 20,000 g/mol to about 1,000,000 g/mol.

15. The method of claim 12, wherein the polyolefin has a melt temperature of about 120° C. to about 140° C.

* * * * *